(12) United States Patent
Hurst et al.

(10) Patent No.: US 9,159,094 B2
(45) Date of Patent: *Oct. 13, 2015

(54) METHODS AND APPARATUS FOR FACILITATION OF ORDERS OF FOOD ITEMS

(71) Applicant: Panera, LLC, St. Louis, MO (US)

(72) Inventors: Blaine E. Hurst, Dedham, MA (US); Ronald Shaich, Brookline, MA (US)

(73) Assignee: PANERA, LLC, St. Louis, MO (US)

( * ) Notice: Subject to any disclaimer, the term of this patent is extended or adjusted under 35 U.S.C. 154(b) by 448 days.

This patent is subject to a terminal disclaimer.

(21) Appl. No.: 13/840,044

(22) Filed: Mar. 15, 2013

(65) Prior Publication Data

US 2014/0279092 A1    Sep. 18, 2014

(51) Int. Cl.
*G06Q 30/00*    (2012.01)
*G06Q 30/06*    (2012.01)

(52) U.S. Cl.
CPC .................................. *G06Q 30/0641* (2013.01)

(58) Field of Classification Search
None
See application file for complete search history.

(56) References Cited

U.S. PATENT DOCUMENTS

| | | | |
|---|---|---|---|
| 3,327,198 A | 6/1967 | Rauch | |
| 4,530,067 A | 7/1985 | Dorr | |
| 4,639,367 A | 1/1987 | Mackles | |
| 4,675,515 A | 6/1987 | Lucero | |
| 4,752,465 A | 6/1988 | Mackles | |
| 4,889,709 A | 12/1989 | Mackles et al. | |
| 4,969,560 A | 11/1990 | Stanfield | |
| 5,029,520 A | 7/1991 | Okada | |
| 5,068,121 A | 11/1991 | Hansen et al. | |
| 5,094,864 A | 3/1992 | Pinon et al. | |
| 5,097,759 A | 3/1992 | Vilgrain et al. | |
| 5,123,337 A | 6/1992 | Vilgrain et al. | |
| 5,235,509 A | 8/1993 | Mueller et al. | |
| 5,312,561 A | 5/1994 | Hoshino et al. | |
| 5,332,105 A | 7/1994 | Stanfield | |
| 5,353,219 A | 10/1994 | Mueller et al. | |
| 5,356,643 A | 10/1994 | Miller et al. | |
| 5,357,426 A | 10/1994 | Morita et al. | |
| RE34,872 E | 3/1995 | Lucero | |
| 5,454,721 A | 10/1995 | Kuch | |
| 5,685,435 A | 11/1997 | Picioccio et al. | |
| 5,704,350 A | 1/1998 | Williams, III | |
| 5,774,871 A | 6/1998 | Ferro | |
| 5,796,640 A | 8/1998 | Sugarman et al. | |
| 5,845,263 A | 12/1998 | Camaisa et al. | |
| 5,876,995 A | 3/1999 | Bryan | |
| 5,907,275 A | 5/1999 | Battistini et al. | |
| 5,937,386 A * | 8/1999 | Frantz | 705/15 |
| 5,940,803 A | 8/1999 | Kanemitsu | |

(Continued)

*Primary Examiner* — Paul Danneman
(74) *Attorney, Agent, or Firm* — Wolf, Greenfield & Sacks, P.C.

(57) ABSTRACT

Embodiments of the invention provide techniques which aid in correctly capturing what a restaurant customer intends to order, and may enhance the customer's satisfaction with the ordering and dining process overall. For example, an interface may be provided through which a customer may specify an order, and the interface may clearly convey such information as each ordered item's ingredients and nutritional content. The interface may enable the customer to customize ordered items, and may clearly convey any changes that the customer has made, allowing the customer to make informed choices about the items included in an order. The interface may embody a design which enables the customer to quickly and easily customize items, and/or to re-order previously customized items.

18 Claims, 28 Drawing Sheets

(56) References Cited

U.S. PATENT DOCUMENTS

| | | |
|---|---|---|
| 6,003,015 A | 12/1999 | Kang et al. |
| 6,038,546 A | 3/2000 | Ferro |
| 6,087,927 A | 7/2000 | Battistini et al. |
| 6,102,162 A | 8/2000 | Teicher |
| 6,113,886 A | 9/2000 | Bryan |
| 6,152,358 A | 11/2000 | Bryan |
| 6,232,107 B1 | 5/2001 | Bryan et al. |
| 6,247,995 B1 | 6/2001 | Bryan |
| 6,415,224 B1 | 7/2002 | Wako et al. |
| 6,415,555 B1 | 7/2002 | Montague |
| 6,436,682 B1 | 8/2002 | Bryan et al. |
| 6,458,080 B1 | 10/2002 | Brown et al. |
| 6,527,712 B1 | 3/2003 | Brown et al. |
| 6,577,969 B2 | 6/2003 | Takeda et al. |
| 6,587,835 B1 | 7/2003 | Treyz et al. |
| 6,618,062 B1 | 9/2003 | Brown et al. |
| 6,636,835 B2 | 10/2003 | Ragsdale-Elliott et al. |
| 6,690,673 B1 | 2/2004 | Jarvis |
| 6,753,830 B2 | 6/2004 | Gelbman |
| 6,761,332 B1 | 7/2004 | Bengtsson |
| 6,787,108 B2 | 9/2004 | Ribi |
| 6,811,516 B1 | 11/2004 | Dugan |
| 6,859,215 B1 | 2/2005 | Brown et al. |
| 6,924,781 B1 | 8/2005 | Gelbman |
| 6,940,394 B2 | 9/2005 | Gagnon |
| 6,987,452 B2 | 1/2006 | Yang |
| 7,024,369 B1 | 4/2006 | Brown et al. |
| 7,108,171 B1 | 9/2006 | Ergo et al. |
| 7,109,315 B2 | 9/2006 | Bryan et al. |
| 7,123,956 B2 | 10/2006 | Oguma |
| 7,132,926 B2 | 11/2006 | Vaseloff et al. |
| 7,321,866 B2 | 1/2008 | Kuwana et al. |
| 7,372,003 B2 | 5/2008 | Kates |
| 7,514,262 B2 | 4/2009 | Ribi |
| 7,536,283 B2 | 5/2009 | Potter et al. |
| 7,571,139 B1 | 8/2009 | Giordano et al. |
| 7,597,844 B2 | 10/2009 | Ribi |
| 7,617,129 B2 | 11/2009 | Momose |
| 7,658,329 B2 | 2/2010 | Gelbman |
| 7,669,768 B2 | 3/2010 | Gelbman |
| 7,673,464 B2 | 3/2010 | Bodin et al. |
| 7,673,800 B2 | 3/2010 | Gelbman |
| 7,677,454 B2 | 3/2010 | Gelbman |
| 7,680,690 B1 | 3/2010 | Catalano |
| 7,703,678 B2 | 4/2010 | Gelbman |
| 7,706,915 B2 | 4/2010 | Mohapatra et al. |
| 7,735,735 B2 | 6/2010 | Gelbman |
| 7,735,736 B2 | 6/2010 | Gelbman |
| 7,743,987 B2 | 6/2010 | Gelbman |
| 7,748,626 B2 | 7/2010 | Gelbman |
| 7,748,627 B2 | 7/2010 | Gelbman |
| 7,753,276 B2 | 7/2010 | Gelbman |
| 7,753,277 B2 | 7/2010 | Gelbman |
| 7,753,772 B1 | 7/2010 | Walker et al. |
| 7,757,954 B2 | 7/2010 | Gelbman |
| 7,762,461 B2 | 7/2010 | Gelbman |
| 7,762,462 B2 | 7/2010 | Gelbman |
| 7,766,238 B2 | 8/2010 | Gelbman |
| 7,784,701 B2 | 8/2010 | Gelbman |
| 7,798,404 B2 | 9/2010 | Gelbman |
| 7,815,116 B2 | 10/2010 | Gelbman |
| 7,835,946 B2 | 11/2010 | Goren et al. |
| 7,871,001 B2 | 1/2011 | Gelbman |
| 7,882,591 B2 | 2/2011 | Arnold |
| 7,891,569 B2 | 2/2011 | Gelbman |
| 7,899,709 B2 | 3/2011 | Allard et al. |
| 7,908,778 B1 | 3/2011 | Dushane |
| 7,913,908 B2 | 3/2011 | Gelbman |
| 7,918,395 B2 | 4/2011 | Gelbman |
| 7,918,396 B2 | 4/2011 | Gelbman |
| 7,946,489 B2 | 5/2011 | Gelbman |
| 7,953,873 B1 | 5/2011 | Madurzak |
| 7,958,457 B1 | 6/2011 | Brandenberg et al. |
| 7,973,642 B2 | 7/2011 | Schackmuth et al. |
| 7,976,386 B2 | 7/2011 | Tran |
| 8,054,218 B2 | 11/2011 | Gelbman |
| 8,069,953 B2 | 12/2011 | Sus et al. |
| 8,078,492 B2 | 12/2011 | Brown et al. |
| 8,101,892 B2 | 1/2012 | Kates |
| 8,108,406 B2 | 1/2012 | Kenedy et al. |
| 8,181,821 B2 | 5/2012 | Freedman |
| 8,190,483 B2 | 5/2012 | Woycik et al. |
| 8,204,757 B2 | 6/2012 | Carlson et al. |
| 8,234,128 B2 | 7/2012 | Martucci et al. |
| 8,234,160 B2 | 7/2012 | Brown et al. |
| 9,070,175 B2 * | 6/2015 | Hurst ................................ 1/1 |
| 2001/0020935 A1 | 9/2001 | Gelbman |
| 2001/0025279 A1 | 9/2001 | Krulak et al. |
| 2001/0054008 A1 | 12/2001 | Miller et al. |
| 2001/0054009 A1 | 12/2001 | Miller et al. |
| 2001/0054067 A1 | 12/2001 | Miller et al. |
| 2002/0002496 A1 | 1/2002 | Miller et al. |
| 2002/0003166 A1 | 1/2002 | Miller et al. |
| 2002/0004749 A1 | 1/2002 | Froseth et al. |
| 2002/0004942 A1 | 1/2002 | Bryan |
| 2002/0007307 A1 | 1/2002 | Miller et al. |
| 2002/0022963 A1 | 2/2002 | Miller et al. |
| 2002/0022992 A1 | 2/2002 | Miller et al. |
| 2002/0022993 A1 | 2/2002 | Miller et al. |
| 2002/0022994 A1 | 2/2002 | Miller et al. |
| 2002/0022995 A1 | 2/2002 | Miller et al. |
| 2002/0023959 A1 | 2/2002 | Miller et al. |
| 2002/0026357 A1 | 2/2002 | Miller et al. |
| 2002/0026358 A1 | 2/2002 | Miller et al. |
| 2002/0026369 A1 | 2/2002 | Miller et al. |
| 2002/0027164 A1 | 3/2002 | Mault et al. |
| 2002/0029181 A1 | 3/2002 | Miller et al. |
| 2002/0030105 A1 | 3/2002 | Miller et al. |
| 2002/0035439 A1 | 3/2002 | Takeda et al. |
| 2002/0046093 A1 | 4/2002 | Miller et al. |
| 2002/0052790 A1 | 5/2002 | Tomishima |
| 2002/0055878 A1 | 5/2002 | Burton et al. |
| 2002/0065717 A1 | 5/2002 | Miller et al. |
| 2002/0095402 A1 | 7/2002 | Dillard et al. |
| 2002/0103751 A1 | 8/2002 | Tanaka |
| 2002/0133418 A1 | 9/2002 | Hammond et al. |
| 2002/0138350 A1 | 9/2002 | Cogen |
| 2002/0147647 A1 | 10/2002 | Ragsdale-Elliott et al. |
| 2002/0152123 A1 | 10/2002 | Giordano et al. |
| 2002/0158137 A1 | 10/2002 | Grey et al. |
| 2002/0167500 A1 | 11/2002 | Gelbman |
| 2002/0174015 A1 | 11/2002 | Kuwana et al. |
| 2003/0046166 A1 | 3/2003 | Liebman |
| 2003/0065561 A1 | 4/2003 | Brown et al. |
| 2003/0066096 A1 | 4/2003 | Bryan |
| 2003/0078793 A1 | 4/2003 | Toth |
| 2003/0088471 A1 | 5/2003 | Tanigaki et al. |
| 2003/0092098 A1 | 5/2003 | Bryan et al. |
| 2003/0120506 A1 | 6/2003 | Komiya et al. |
| 2003/0171944 A1 | 9/2003 | Fine et al. |
| 2003/0185706 A1 | 10/2003 | Ribi |
| 2003/0208396 A1 | 11/2003 | Miller et al. |
| 2003/0208409 A1 | 11/2003 | Mault |
| 2004/0010425 A1 | 1/2004 | Wilkes et al. |
| 2004/0034568 A1 | 2/2004 | Sone |
| 2004/0054592 A1 | 3/2004 | Hernblad |
| 2004/0078231 A1 | 4/2004 | Wilkes et al. |
| 2004/0107141 A1 | 6/2004 | Conkel et al. |
| 2004/0133483 A1 | 7/2004 | Potter et al. |
| 2004/0143512 A1 | 7/2004 | Sturr, Jr. |
| 2004/0158499 A1 | 8/2004 | Dev et al. |
| 2004/0167465 A1 | 8/2004 | Mihai et al. |
| 2004/0167804 A1 | 8/2004 | Simpson et al. |
| 2004/0172222 A1 | 9/2004 | Simpson et al. |
| 2004/0172300 A1 | 9/2004 | Mihai et al. |
| 2004/0172301 A1 | 9/2004 | Mihai et al. |
| 2004/0172302 A1 | 9/2004 | Martucci et al. |
| 2004/0176667 A1 | 9/2004 | Mihai et al. |
| 2004/0186783 A1 | 9/2004 | Knight et al. |
| 2004/0187146 A1 | 9/2004 | Iga |
| 2004/0199425 A1 | 10/2004 | Van Luchene et al. |
| 2004/0210621 A1 | 10/2004 | Antonellis |
| 2004/0230496 A1 | 11/2004 | Neuman et al. |
| 2004/0243471 A1 | 12/2004 | Salmen et al. |

(56) References Cited

U.S. PATENT DOCUMENTS

| | | |
|---|---|---|
| 2004/0243472 A1 | 12/2004 | Vadjinia |
| 2004/0249497 A1 | 12/2004 | Saigh et al. |
| 2004/0249724 A1 | 12/2004 | Gosewehr |
| 2004/0257918 A1 | 12/2004 | Ribi |
| 2004/0260607 A1 | 12/2004 | Robbins et al. |
| 2005/0004843 A1 | 1/2005 | Heflin |
| 2005/0021407 A1 | 1/2005 | Kargman |
| 2005/0027174 A1 | 2/2005 | Benardot |
| 2005/0037498 A1 | 2/2005 | Ribi |
| 2005/0046547 A1 | 3/2005 | Gagnon |
| 2005/0049922 A1 | 3/2005 | Kargman |
| 2005/0055242 A1 | 3/2005 | Bello et al. |
| 2005/0055244 A1 | 3/2005 | Mullan et al. |
| 2005/0065817 A1 | 3/2005 | Mihai et al. |
| 2005/0075934 A1 | 4/2005 | Knight et al. |
| 2005/0080650 A1 | 4/2005 | Noel |
| 2005/0104730 A1 | 5/2005 | Yang |
| 2005/0114150 A1 | 5/2005 | Franklin |
| 2005/0144066 A1 | 6/2005 | Cope et al. |
| 2005/0160005 A1 | 7/2005 | Roth et al. |
| 2005/0171902 A1 | 8/2005 | Nguyen |
| 2005/0193901 A1 | 9/2005 | Buehler |
| 2005/0209963 A1 | 9/2005 | Momose |
| 2005/0211775 A1 | 9/2005 | Vaseloff et al. |
| 2005/0246223 A1 | 11/2005 | Roth et al. |
| 2005/0266491 A1 | 12/2005 | Bryan et al. |
| 2005/0267811 A1 | 12/2005 | Almblad |
| 2005/0272111 A1 | 12/2005 | Bryan et al. |
| 2005/0278065 A1 | 12/2005 | Garza |
| 2006/0015904 A1 | 1/2006 | Marcus |
| 2006/0053505 A1 | 3/2006 | Bryan |
| 2006/0064447 A1 | 3/2006 | Malkov |
| 2006/0069461 A1 | 3/2006 | Kaneko et al. |
| 2006/0085265 A1 | 4/2006 | Dietz et al. |
| 2006/0149416 A1 | 7/2006 | Mohapatra et al. |
| 2006/0149642 A1 | 7/2006 | Dillard et al. |
| 2006/0169787 A1 | 8/2006 | Gelbman |
| 2006/0173754 A1 | 8/2006 | Burton et al. |
| 2006/0178986 A1 | 8/2006 | Giordano et al. |
| 2006/0213904 A1 | 9/2006 | Kates |
| 2006/0218039 A1 | 9/2006 | Johnson |
| 2006/0293965 A1 | 12/2006 | Burton |
| 2007/0005185 A1 | 1/2007 | Roth et al. |
| 2007/0005434 A1 | 1/2007 | Roth et al. |
| 2007/0024551 A1 | 2/2007 | Gelbman |
| 2007/0055573 A1 | 3/2007 | Grell |
| 2007/0088624 A1 | 4/2007 | Vaughn et al. |
| 2007/0150375 A1 | 6/2007 | Yang |
| 2007/0158335 A1 | 7/2007 | Mansbery |
| 2007/0168223 A1 | 7/2007 | Fors et al. |
| 2007/0190501 A1 | 8/2007 | Brown et al. |
| 2007/0198432 A1 | 8/2007 | Pitroda et al. |
| 2007/0243934 A1 | 10/2007 | Little et al. |
| 2007/0250391 A1 | 10/2007 | Prade et al. |
| 2007/0264395 A1 | 11/2007 | Adams et al. |
| 2007/0265935 A1 | 11/2007 | Woycik et al. |
| 2007/0294129 A1 | 12/2007 | Froseth et al. |
| 2007/0298885 A1 | 12/2007 | Tran |
| 2008/0026816 A1 | 1/2008 | Sammon et al. |
| 2008/0033827 A1 | 2/2008 | Kuang et al. |
| 2008/0033935 A1 | 2/2008 | Frank |
| 2008/0033936 A1 | 2/2008 | Frank |
| 2008/0033944 A1 | 2/2008 | Frank |
| 2008/0034001 A1 | 2/2008 | Noel |
| 2008/0040336 A1 | 2/2008 | Frank |
| 2008/0047282 A1 | 2/2008 | Bodin et al. |
| 2008/0047781 A1 | 2/2008 | Feiertag |
| 2008/0065505 A1 | 3/2008 | Plastina et al. |
| 2008/0065685 A1 | 3/2008 | Frank |
| 2008/0077455 A1 | 3/2008 | Gilboa |
| 2008/0157961 A1 | 7/2008 | Park et al. |
| 2008/0189172 A1 | 8/2008 | Goren et al. |
| 2008/0204246 A1 | 8/2008 | Kates |
| 2008/0208787 A1 | 8/2008 | Luchene |
| 2008/0228600 A1 | 9/2008 | Treyz et al. |
| 2008/0255930 A1 | 10/2008 | Cope et al. |
| 2008/0255941 A1 | 10/2008 | Otto et al. |
| 2008/0270324 A1 | 10/2008 | Allard et al. |
| 2008/0276199 A1 | 11/2008 | Hosogai et al. |
| 2008/0295207 A1 | 11/2008 | Baum et al. |
| 2008/0297442 A1 | 12/2008 | Gelbman |
| 2008/0297454 A1 | 12/2008 | Gelbman |
| 2008/0309551 A1 | 12/2008 | Gelbman |
| 2008/0313052 A1 | 12/2008 | Otto et al. |
| 2008/0314991 A1 | 12/2008 | Gelbman |
| 2008/0314992 A1 | 12/2008 | Gelbman |
| 2008/0318679 A1 | 12/2008 | Tran et al. |
| 2009/0014512 A1 | 1/2009 | Gelbman |
| 2009/0014517 A1 | 1/2009 | Gelbman |
| 2009/0014528 A1 | 1/2009 | Gelbman |
| 2009/0014529 A1 | 1/2009 | Gelbman |
| 2009/0014530 A1 | 1/2009 | Gelbman |
| 2009/0014531 A1 | 1/2009 | Gelbman |
| 2009/0014532 A1 | 1/2009 | Gelbman |
| 2009/0014533 A1 | 1/2009 | Gelbman |
| 2009/0014534 A1 | 1/2009 | Gelbman |
| 2009/0014535 A1 | 1/2009 | Gelbman |
| 2009/0014536 A1 | 1/2009 | Gelbman |
| 2009/0014537 A1 | 1/2009 | Gelbman |
| 2009/0014538 A1 | 1/2009 | Gelbman |
| 2009/0014539 A1 | 1/2009 | Gelbman |
| 2009/0014540 A1 | 1/2009 | Gelbman |
| 2009/0014541 A1 | 1/2009 | Gelbman |
| 2009/0014542 A1 | 1/2009 | Gelbman |
| 2009/0015427 A1 | 1/2009 | Gelbman |
| 2009/0020605 A1 | 1/2009 | Gelbman |
| 2009/0020614 A1 | 1/2009 | Gelbman |
| 2009/0026273 A1 | 1/2009 | Gelbman |
| 2009/0026274 A1 | 1/2009 | Gelbman |
| 2009/0039169 A1 | 2/2009 | Gelbman |
| 2009/0048878 A1 | 2/2009 | Metcalf |
| 2009/0063285 A1 | 3/2009 | Ablowitz et al. |
| 2009/0064445 A1 | 3/2009 | Arnold |
| 2009/0106124 A1 | 4/2009 | Yang |
| 2009/0119168 A1 | 5/2009 | Otto et al. |
| 2009/0125380 A1 | 5/2009 | Otto et al. |
| 2009/0150193 A1 | 6/2009 | Hong et al. |
| 2009/0167553 A1 | 7/2009 | Hong et al. |
| 2009/0172035 A1 | 7/2009 | Lessing et al. |
| 2009/0192901 A1 | 7/2009 | Egeresi |
| 2009/0196958 A1 | 8/2009 | Sosebee |
| 2009/0204492 A1 | 8/2009 | Scifo et al. |
| 2009/0228336 A1 | 9/2009 | Giordano et al. |
| 2009/0228836 A1 | 9/2009 | Silva |
| 2009/0241481 A1 | 10/2009 | Sus et al. |
| 2009/0259553 A1 | 10/2009 | Carroll et al. |
| 2009/0259554 A1 | 10/2009 | Carroll et al. |
| 2009/0259555 A1 | 10/2009 | Carroll et al. |
| 2009/0259556 A1 | 10/2009 | Carroll et al. |
| 2009/0259557 A1 | 10/2009 | Carroll et al. |
| 2009/0259558 A1 | 10/2009 | Carroll et al. |
| 2009/0259559 A1 | 10/2009 | Carroll et al. |
| 2009/0265247 A1 | 10/2009 | Carroll et al. |
| 2009/0275002 A1 | 11/2009 | Hoggle |
| 2009/0281903 A1 | 11/2009 | Blatstein |
| 2009/0307096 A1 | 12/2009 | Antonellis |
| 2010/0005489 A1 | 1/2010 | Losey |
| 2010/0012676 A1 | 1/2010 | Freedman |
| 2010/0024361 A1 | 2/2010 | Ebeling |
| 2010/0030661 A1 | 2/2010 | Friedland et al. |
| 2010/0064394 A1 | 3/2010 | Baum et al. |
| 2010/0076854 A1 | 3/2010 | Martucci et al. |
| 2010/0082444 A1 | 4/2010 | Lin et al. |
| 2010/0082485 A1 | 4/2010 | Lin et al. |
| 2010/0114595 A1 | 5/2010 | Richard |
| 2010/0121807 A1 | 5/2010 | Perrier et al. |
| 2010/0129502 A1 | 5/2010 | Feinberg et al. |
| 2010/0136179 A1 | 6/2010 | Mochizuki et al. |
| 2010/0161446 A1 | 6/2010 | Alfred et al. |
| 2010/0169170 A1 | 7/2010 | Fordyce et al. |
| 2010/0169262 A1 | 7/2010 | Kenedy et al. |
| 2010/0169313 A1 | 7/2010 | Kenedy et al. |
| 2010/0169338 A1 | 7/2010 | Kenedy et al. |
| 2010/0169340 A1 | 7/2010 | Kenedy et al. |

(56) References Cited

U.S. PATENT DOCUMENTS

| | | |
|---|---|---|
| 2010/0169342 A1 | 7/2010 | Kenedy et al. |
| 2010/0169343 A1 | 7/2010 | Kenedy et al. |
| 2010/0211469 A1 | 8/2010 | Salmon et al. |
| 2010/0241707 A1 | 9/2010 | Burton et al. |
| 2010/0262507 A1 | 10/2010 | Wolfe et al. |
| 2010/0280895 A1 | 11/2010 | Mottola |
| 2010/0312385 A1 | 12/2010 | Deuber |
| 2010/0332571 A1 | 12/2010 | Healey et al. |
| 2011/0029866 A1 | 2/2011 | Watanabe et al. |
| 2011/0031236 A1 | 2/2011 | Ben-Shmuel et al. |
| 2011/0070566 A1 | 3/2011 | Hanulak et al. |
| 2011/0093363 A1 | 4/2011 | Blatstein |
| 2011/0106698 A1 | 5/2011 | Isaacson et al. |
| 2011/0136516 A1 | 6/2011 | Ellis |
| 2011/0153467 A1 | 6/2011 | Salmen et al. |
| 2011/0160550 A1 | 6/2011 | Hwang et al. |
| 2011/0187664 A1 | 8/2011 | Rinehart |
| 2011/0218839 A1 | 9/2011 | Shamaiengar |
| 2011/0225032 A1 | 9/2011 | Kobres |
| 2011/0253482 A1 | 10/2011 | Purgatorio et al. |
| 2011/0258011 A1 | 10/2011 | Burns et al. |
| 2011/0261049 A1 | 10/2011 | Cardno et al. |
| 2011/0282726 A1 | 11/2011 | Brown et al. |
| 2011/0321127 A1 | 12/2011 | Pitroda et al. |
| 2012/0005077 A1 | 1/2012 | Pitroda et al. |
| 2012/0005078 A1 | 1/2012 | Pitroda et al. |
| 2012/0005079 A1 | 1/2012 | Pitroda et al. |
| 2012/0005080 A1 | 1/2012 | Pitroda et al. |
| 2012/0005081 A1 | 1/2012 | Pitroda et al. |
| 2012/0005082 A1 | 1/2012 | Pitroda et al. |
| 2012/0005083 A1 | 1/2012 | Pitroda et al. |
| 2012/0005084 A1 | 1/2012 | Pitroda et al. |
| 2012/0005085 A1 | 1/2012 | Pitroda et al. |
| 2012/0005086 A1 | 1/2012 | Pitroda et al. |
| 2012/0005087 A1 | 1/2012 | Pitroda et al. |
| 2012/0005088 A1 | 1/2012 | Pitroda et al. |
| 2012/0005089 A1 | 1/2012 | Pitroda et al. |
| 2012/0005090 A1 | 1/2012 | Pitroda et al. |
| 2012/0005091 A1 | 1/2012 | Pitroda et al. |
| 2012/0005092 A1 | 1/2012 | Pitroda et al. |
| 2012/0005725 A1 | 1/2012 | Pitroda et al. |
| 2012/0005726 A1 | 1/2012 | Pitroda et al. |
| 2012/0011058 A1 | 1/2012 | Pitroda et al. |
| 2012/0029928 A1 | 2/2012 | Kountotsis |
| 2012/0030583 A1 | 2/2012 | DiPietro |
| 2012/0069131 A1 | 3/2012 | Abelow |
| 2012/0075168 A1 | 3/2012 | Osterhout et al. |
| 2012/0078734 A1 | 3/2012 | Sus et al. |
| 2012/0084135 A1 | 4/2012 | Nissan et al. |
| 2012/0096403 A1 | 4/2012 | Jung et al. |
| 2012/0101831 A1 | 4/2012 | Pitroda et al. |
| 2012/0101832 A1 | 4/2012 | Pitroda et al. |
| 2012/0101833 A1 | 4/2012 | Pitroda et al. |
| 2012/0101834 A1 | 4/2012 | Pitroda et al. |
| 2012/0101835 A1 | 4/2012 | Pitroda et al. |
| 2012/0101836 A1 | 4/2012 | Pitroda et al. |
| 2012/0109667 A1 | 5/2012 | Pitroda et al. |
| 2012/0109668 A1 | 5/2012 | Pitroda et al. |
| 2012/0109669 A1 | 5/2012 | Pitroda et al. |
| 2012/0109670 A1 | 5/2012 | Pitroda et al. |
| 2012/0109671 A1 | 5/2012 | Pitroda et al. |
| 2012/0109672 A1 | 5/2012 | Pitroda et al. |
| 2012/0109673 A1 | 5/2012 | Pitroda et al. |
| 2012/0109674 A1 | 5/2012 | Pitroda et al. |
| 2012/0116790 A1 | 5/2012 | Pitroda et al. |
| 2012/0116959 A1 | 5/2012 | Pitroda et al. |
| 2012/0129517 A1 | 5/2012 | Fox et al. |
| 2012/0131034 A1 | 5/2012 | Kenedy et al. |
| 2012/0150599 A1 | 6/2012 | Isaacson et al. |
| 2012/0150600 A1 | 6/2012 | Isaacson et al. |
| 2012/0150605 A1 | 6/2012 | Isaacson et al. |
| 2012/0150610 A1 | 6/2012 | Isaacson et al. |
| 2012/0150615 A1 | 6/2012 | Isaacson et al. |
| 2012/0150643 A1 | 6/2012 | Wolfe et al. |
| 2012/0150728 A1 | 6/2012 | Isaacson et al. |
| 2012/0150729 A1 | 6/2012 | Isaacson et al. |
| 2012/0150730 A1 | 6/2012 | Isaacson et al. |
| 2012/0150731 A1 | 6/2012 | Isaacson et al. |
| 2012/0150732 A1 | 6/2012 | Isaacson et al. |
| 2012/0150743 A1 | 6/2012 | Isaacson et al. |
| 2012/0156337 A1 | 6/2012 | Studor et al. |
| 2012/0156339 A1 | 6/2012 | Studor et al. |
| 2012/0156343 A1 | 6/2012 | Studor et al. |
| 2012/0156344 A1 | 6/2012 | Studor et al. |
| 2012/0166267 A1 | 6/2012 | Beatty et al. |
| 2012/0171646 A1 | 7/2012 | Chen et al. |
| 2012/0173336 A1 | 7/2012 | Strumolo |
| 2012/0179584 A1 | 7/2012 | Woycik et al. |
| 2012/0183932 A1 | 7/2012 | Chang et al. |
| 2012/0185305 A1 | 7/2012 | Brown et al. |
| 2012/0190386 A1 | 7/2012 | Anderson |
| 2012/0194418 A1 | 8/2012 | Osterhouet et al. |
| 2012/0194419 A1 | 8/2012 | Osterhouet et al. |
| 2012/0194420 A1 | 8/2012 | Osterhout et al. |
| 2012/0194549 A1 | 8/2012 | Osterhout et al. |
| 2012/0194550 A1 | 8/2012 | Osterhout et al. |
| 2012/0194551 A1 | 8/2012 | Osterhout et al. |
| 2012/0194552 A1 | 8/2012 | Osterhout et al. |
| 2012/0194553 A1 | 8/2012 | Osterhout et al. |
| 2012/0200488 A1 | 8/2012 | Osterhout et al. |
| 2012/0200499 A1 | 8/2012 | Osterhout et al. |
| 2012/0200601 A1 | 8/2012 | Osterhout et al. |
| 2012/0253828 A1 | 10/2012 | Bellacicco, Jr. |
| 2013/0151357 A1 | 6/2013 | Havas et al. |
| 2014/0109013 A1* | 4/2014 | Woycik et al. ............ 715/841 |

* cited by examiner

METHODS AND APPARATUS FOR FACILITATION OF ORDERS OF FOOD ITEMS

BACKGROUND

In the restaurant industry, incorrectly capturing what a customer intends to order is a significant issue. This may occur, for example, because the customer misunderstands the ingredients of an item that he/she orders, or the manner in which the item is typically prepared. It may also occur because a restaurant employee (e.g., a server or cashier) misunderstands what the customer attempts to convey when verbally articulating his/her order, because the restaurant employee incorrectly enters the customer's order into the restaurant's systems, and/or for other reasons.

Incorrectly capturing what a customer intends to order can be costly for a restaurant, for several reasons. First, the customer may return items which are not prepared to their liking, and ask that they be re-prepared, so that the ingredients of the originally prepared items may be thrown away. If the originally ordered items had been delivered to the customer's home or business, then the restaurant may incur transportation costs in dispatching re-prepared items to the customer. In addition, receiving incorrectly prepared items may leave the customer unsatisfied with their overall experience at the restaurant, which may make them hesitant to return there, and may lead them to express their disappointment to others.

SUMMARY

Some embodiments of the invention provide techniques and systems which may enrich a customer's overall experience with a restaurant, in a number of different ways. For example, some embodiments of the invention may provide techniques and systems which enable a customer to customize items offered by the restaurant (e.g., by allowing the customer to modify "standard" items on the restaurant's menu in some respect), while clearly conveying the customization options available to the customer, and dynamically demonstrating the effects of any customization that the customer performs (e.g., on an item's ingredients, nutritional content, etc.). Some embodiments of the invention may provide an interface which embodies a design enabling customers to place orders with a minimum of input, so that the ordering process is fast, easy and hassle-free from the customer's perspective. The interface may enable the customer to communicate his/her order directly to the restaurant's systems, thereby avoiding the possibility of a restaurant employee misunderstanding the customer's order, or entering it incorrectly. The overall effect of the techniques and systems described herein is to provide the customer with more information on the options available to him/her, allowing him/her to make more informed decisions about the food they consume, while providing him/her with a greater sense of control over the ordering process and enhancing his/her overall experience at the restaurant.

The foregoing is a non-limiting summary of some embodiments of the invention, aspects of which are defined by the attached claims.

BRIEF DESCRIPTION OF DRAWINGS

The accompanying drawings are not intended to be drawn to scale. In the drawings, each identical or nearly identical component as illustrated in various figures is represented by a like numeral. For purposes of clarity, not every component may be labeled in every drawing. In the drawings:

FIG. 1 is a representative screen interface enabling a customer to select an item for optional customization, in accordance with some embodiments of the invention;

FIG. 9A is a representative screen interface enabling a customer to change the amount of an ingredient in an item, in accordance with some embodiments of the invention;

DESCRIPTION

Figure 2:
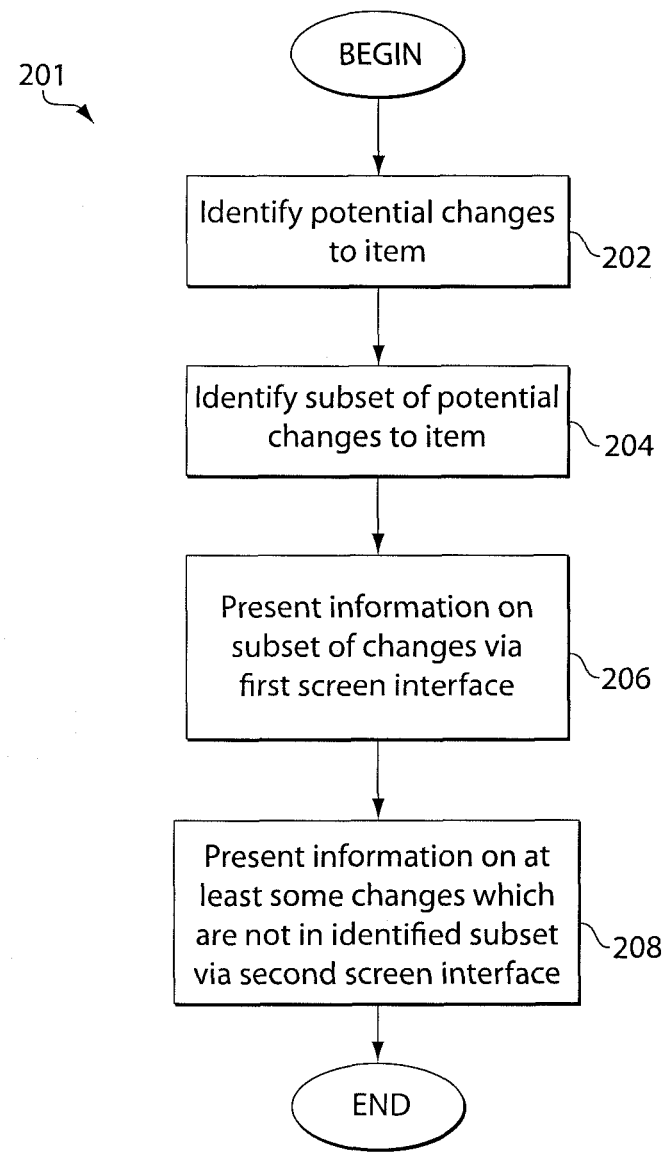
FIG. 2 is a flowchart showing a representative process for identifying and displaying a subset of allowed changes to a customer, in accordance with some embodiments of the invention.

In some embodiments of the invention, techniques and systems are provided which may enrich a customer's overall experience with a restaurant. For example, some embodiments may provide tools which enable customers to customize items offered by the restaurant. These tools may clearly convey the customization options available to the customer, and dynamically update the item information displayed, to clearly illustrate the effects of any customization performed by the customer. In some embodiments, an interface is provided which enables customers to place orders with a minimum of input, so that from the customer's perspective, the ordering process is fast, easy and hassle-free. Thus, some embodiments of the invention may provide the customer with more information on the options available to him/her, allowing him/her to make more informed decisions about the food they consume, while providing him/her with a greater sense of control over the ordering process, using a streamlined and hassle-free interface.

I. Ordering and Customization

Figure 1:
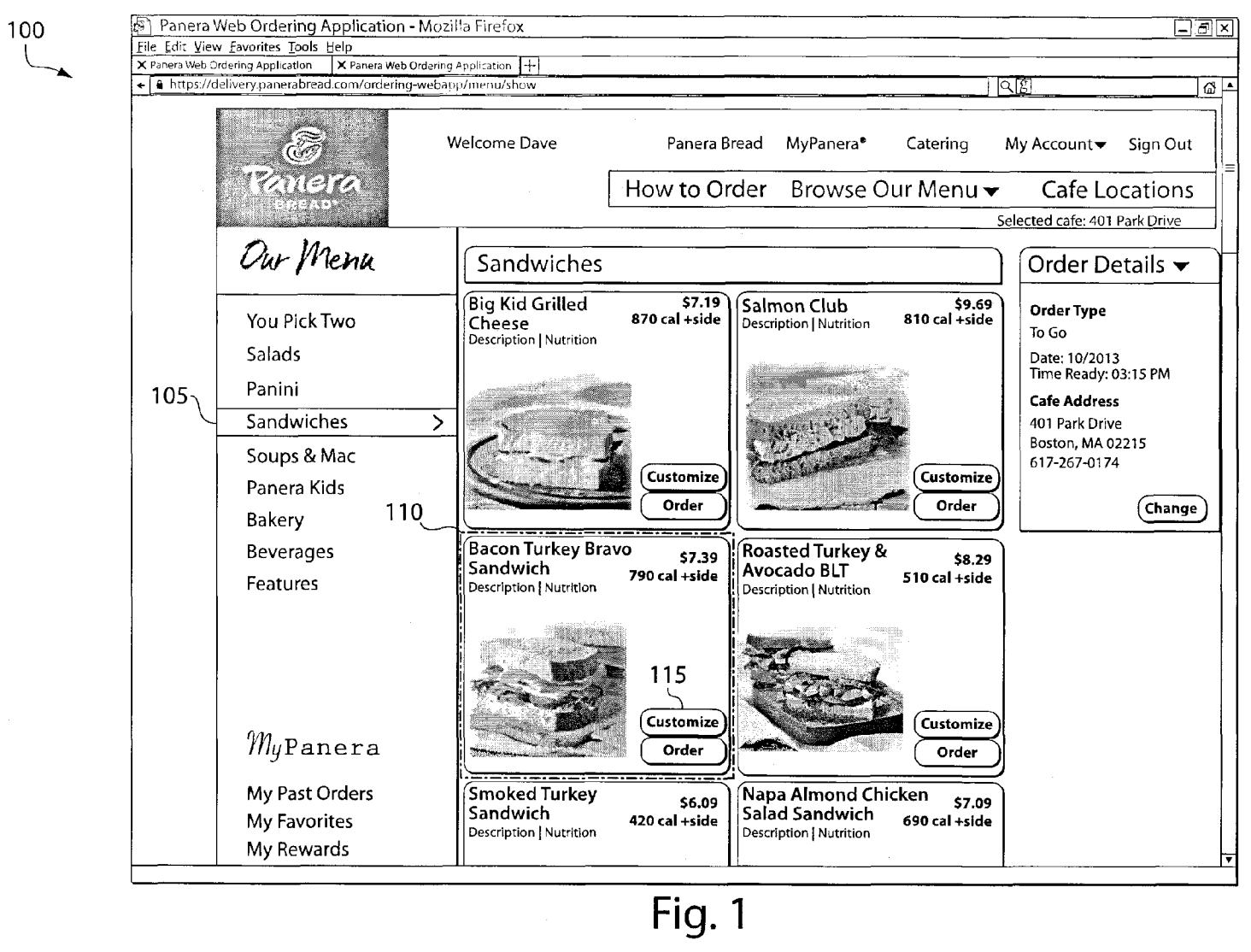

FIG. 1 depicts a representative screen interface 100 which enables a customer to start the process of placing an order comprising one or more food items, in accordance with some embodiments of the invention. In the example shown in FIG. 1, representative screen interface 100 is presented by a web browser, which may execute on any suitable type of computer, such as a desktop or laptop computer, a kiosk device (e.g., situated within a restaurant), a mobile device (e.g., a smartphone, tablet device, and/or any other suitable mobile device), and/or any other suitable device(s). It should be appreciated, however, that the invention is not limited to employing a web browser to present a screen interface, as a stand-alone application (e.g., executing on a desktop or laptop computer, mobile device, and/or other suitable device), and/or any other suitable display component(s), may present one or more screen interfaces providing the capabilities described herein. Embodiments of the invention are not limited to any particular manner of implementation.

By providing input to representative screen interface 100, a customer may select an item from the menu of items shown, for inclusion in an order. In the example shown in FIG. 1, a customer has selected item 105 (i.e., "sandwiches"), causing portions of the screen interface 100 to display information on various sandwich offerings. In the example shown, display portion 110 displays information on the "Bacon Turkey Bravo" sandwich. The customer may view more information on this item, and customize the item's ingredients, by providing input to (e.g., clicking, tapping, providing voice input to, etc.) button 115.

Some embodiments of the invention provide techniques which enable a customer to quickly and easily customize an item to be included in an order, by identifying, from among all the types of changes that a customer could make to the item, the changes that are most commonly made, and providing quick access to these "popular" actions. By filtering the universe of possible changes to a manageable subset, and providing quick access on a single screen interface to this subset without precluding access to the full universe, some embodiments of the invention allow customers to quickly locate the types of changes he/she is most likely to want to make, while still providing the customer the ability to make other types of changes. Providing quick access on a single screen interface to some types of changes may enable the customer to "get to" the item which incorporates the changes that he/she would like with a minimum of input, and without overwhelming him/her with a large number of potential options.

A representative process 201 for identifying and presenting information on a subset of customization actions is shown in FIG. 2. At the start of representative process 201, the universe of potential changes to an item are identified in act 202. This may be performed in any of numerous ways. In some embodiments of the invention, potential changes to an item may include ingredients that may be added to the item, either to supplement or as a substitution for another ingredient that is included in a "standard" version of the item. Of course, embodiments of the invention are not limited in this regard, as any suitable type of change may be made available. For example, a manner of preparing an items may be made available as an option, in addition to or instead of ingredients that may be added to the item.

Representative process 201 then proceeds to act 204, wherein a subset of changes to the item are identified from among the universe of potential changes identified in act 202. This also may be performed in any of numerous ways, such as by applying one or more filters to the universe of potential changes.

In some embodiments, the changes identified in act 204 are those which are the most commonly requested by a population of other customers, such as a population of customers who visited restaurants in a particular geographic area, who share certain characteristics with the customer presently attempting to customize the item, and/or who are identified using any other suitable methodology. Of course, the subset of changes identified in act 204 need not constitute those which are most popular or common among other customers. For example, the subset may include changes which form part of a predefined collection, such as changes which relate to certain dietary goals (e.g., ingredients which may be added to the item to make it vegetarian, gluten-free, allergen-free, etc.), which are affiliated with a particular organization, which are promoted by a particular celebrity spokesperson or other individual, etc. Embodiments of the invention are not limited to identifying the subset of changes in act 204 in any particular manner.

Figure 3:
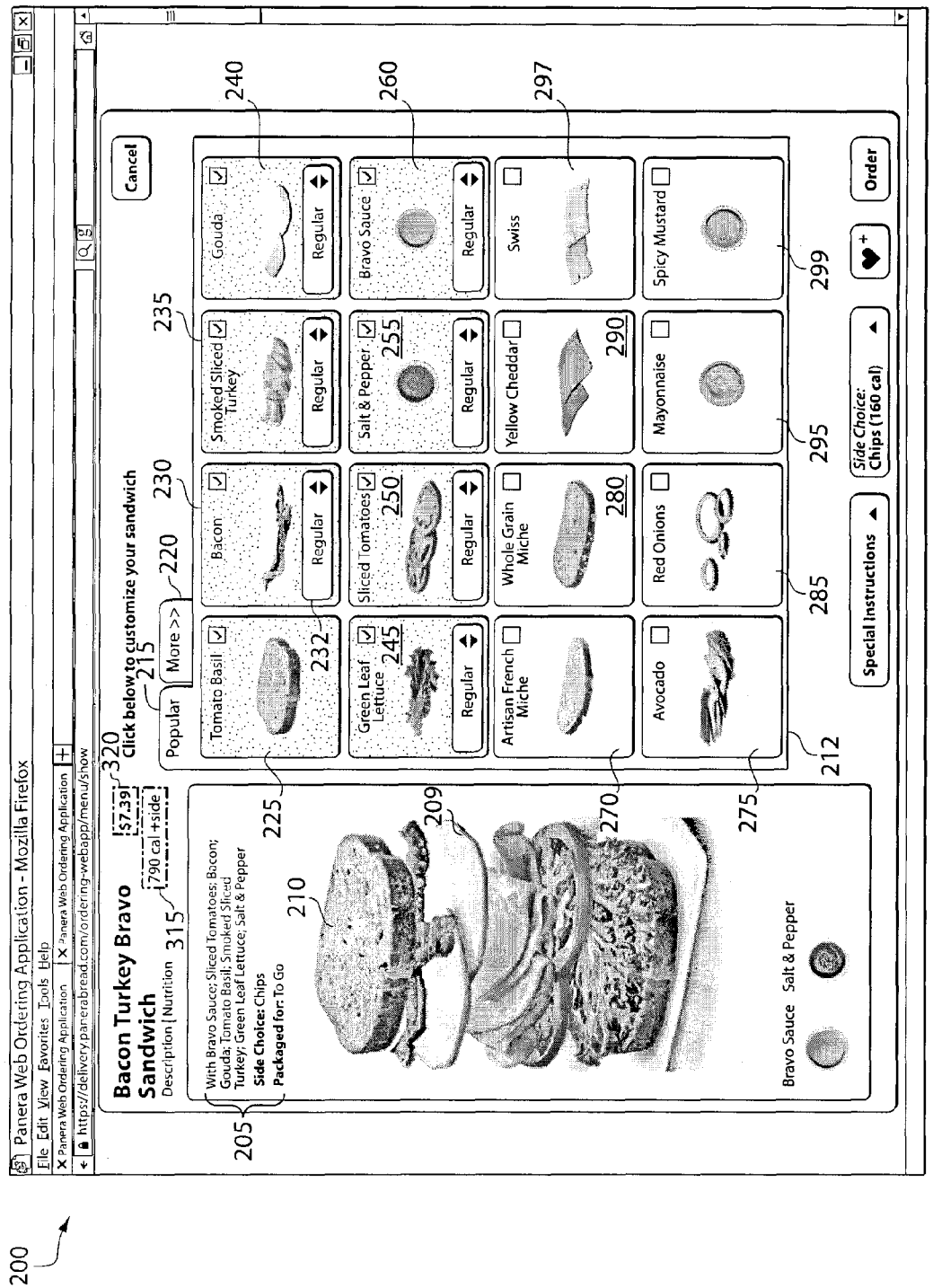
FIG. 3 is a representative screen interface displaying an item and various customization options relating to the item, in accordance with some embodiments of the invention.

Representative process 201 then proceeds to act 206, wherein information on the identified subset of changes is presented to the customer. This, too, may be performed in any of numerous ways. One representative manner of presenting information is shown in FIG. 3, which depicts screen interface 200. In some embodiments of the invention, representative screen interface 200 may be shown when the customer provides input to button 115 on representative screen interface 100 (FIG. 1), indicating a desire to customize the "Bacon Turkey Bravo Sandwich" item.

Screen interface 200 employs a tab metaphor, as is known in the art, with two tabs 215, 220 labeled "popular" and "more", respectively. When screen interface 200 is initially displayed to the customer, the information relating to the "popular" tab 215 is shown, which includes the subset of changes identified in act 204, as well as the ingredients of a "standard" version of the item. In particular, display portion 212 of screen interface 200 indicates ingredients comprising the standard version of the item via highlighting, including "tomato basil" bread (indicated by display area 225), "bacon" (indicated by display area 230), "smoked sliced turkey" (indicated by display area 235), "gouda" cheese (indicated by display area 240), "green leaf lettuce" and "sliced tomatoes" (indicated by display areas 245 and 250), "salt and pepper" (indicated by display area 255) and "bravo sauce" (indicated by display area 260). Ingredients which are most commonly added to the item are indicated via non-highlighted display areas. Specifically, in the example shown, eight ingredients which are most commonly added to the item are shown, including two types of bread (i.e., "artisan French miche", indicated by display area 270, and "whole grain miche", indicated by display area 280), two types of cheese (i.e., "yellow cheddar", indicated by display area 290, and "swiss", indicated by display area 297), two types of topping (i.e., "avocado", indicated by display area 275, and "red onions", indicated by display area 285), and two types of condiment (i.e., "mayonnaise", indicated by display area 295, and "spicy mustard", indicated by display area 299). Of course, embodiments of the invention are not limited to displaying information on eight ingredients in total, on any number of a particular type of ingredient, or on any number of different types of ingredients. In addition, embodiments of the invention are not limited to displaying information on ingredients that may be added to an item, as any suitable information may be shown.

It should be appreciated that by streamlining the universe of potential changes to an item to a manageable subset, represented on a single screen interface, embodiments of the invention may improve the customer's experience by reducing the amount of information he/she needs to review, and the amount of input he/she provides, to customize an item. As such, the customer's satisfaction with the ordering process and with the ordered item may be enhanced overall.

At the completion of act 206, representative process 201 proceeds to act 208, wherein information is presented on potential changes which are not in the subset identified in act 204. Such information may be shown, for example, if the customer provides input to tab 220 (i.e., labeled "more").

Figure 4:
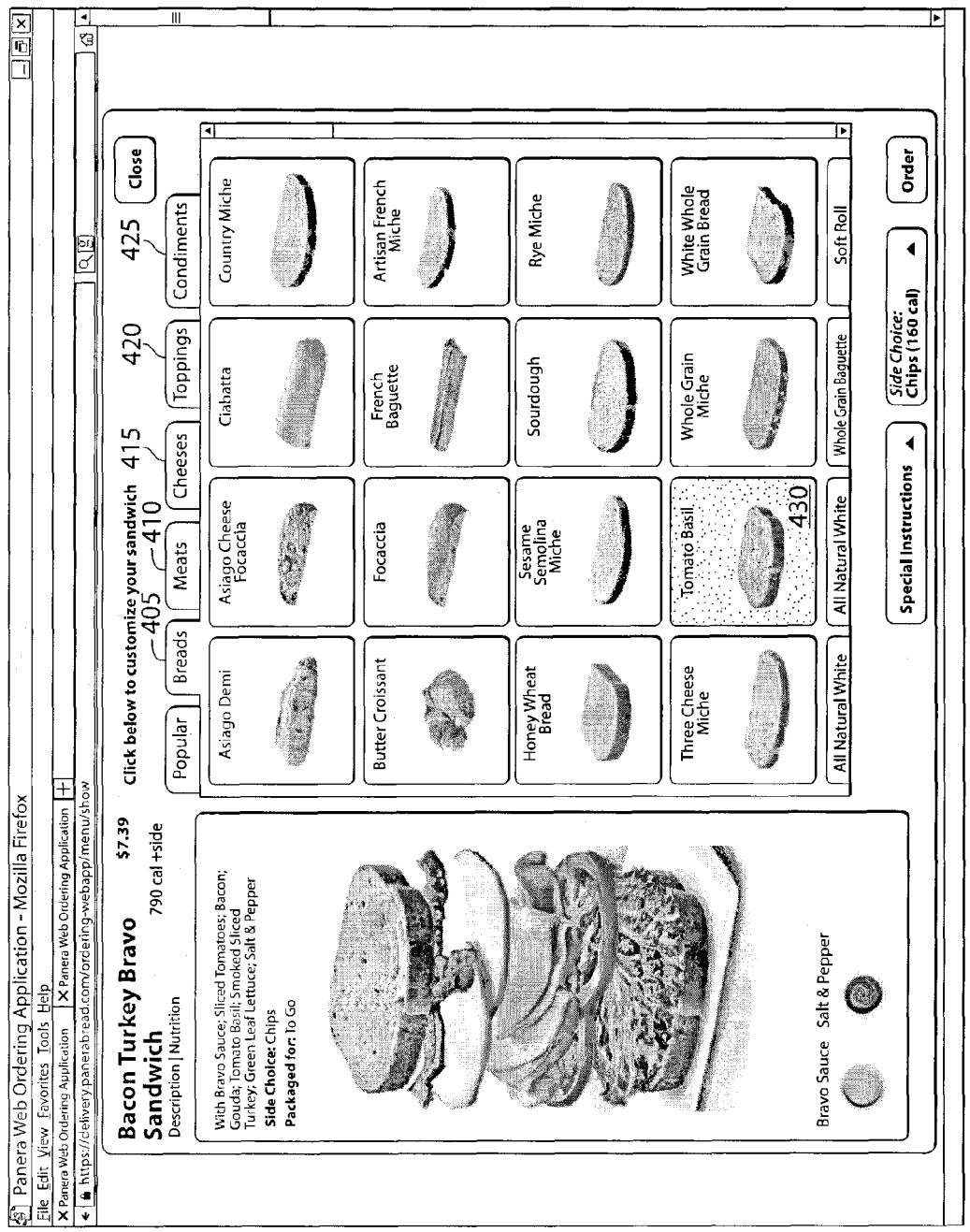
FIG. 4 is a representative screen interface displaying various customization options relating to an item, in accordance with some embodiments of the invention.

Representative screen interface 400, shown in FIG. 4, shows some examples of the types of information which may be displayed. Specifically, providing input to tab 220 causes a number of other tabs to be shown, each representing a group of ingredient choices. In representative screen interface 400, these tabs include "breads" tab 405, "meats" tab 410, "cheeses" tab 415, "toppings" tab 420, and "condiments" tab 425. In the example shown in FIG. 4, the "breads" tab 405 is initially displayed, so that potential bread choices for the "Bacon Turkey Bravo" item are shown. The highlighting of the "tomato basil" bread choice at 430 indicates that this choice is initially selected, as it is the default choice for the item. Process 201 then completes.

II. Updating Item Information in Response to Changes

Returning to FIG. 3, screen interface 200 shows information on the "Bacon Turkey Bravo" item other than the ingredients that may be added to the item. In this respect, screen interface 200 displays a text listing of the item's ingredients 205, graphical images of the item and its ingredients 210, its nutritional content 315, and its price 320. In some embodiments of the invention, this and/or other information relating to an item may be dynamically updated as a customer makes changes to the item, to clearly convey to the customer the impact of any changes made.

Figure 5:
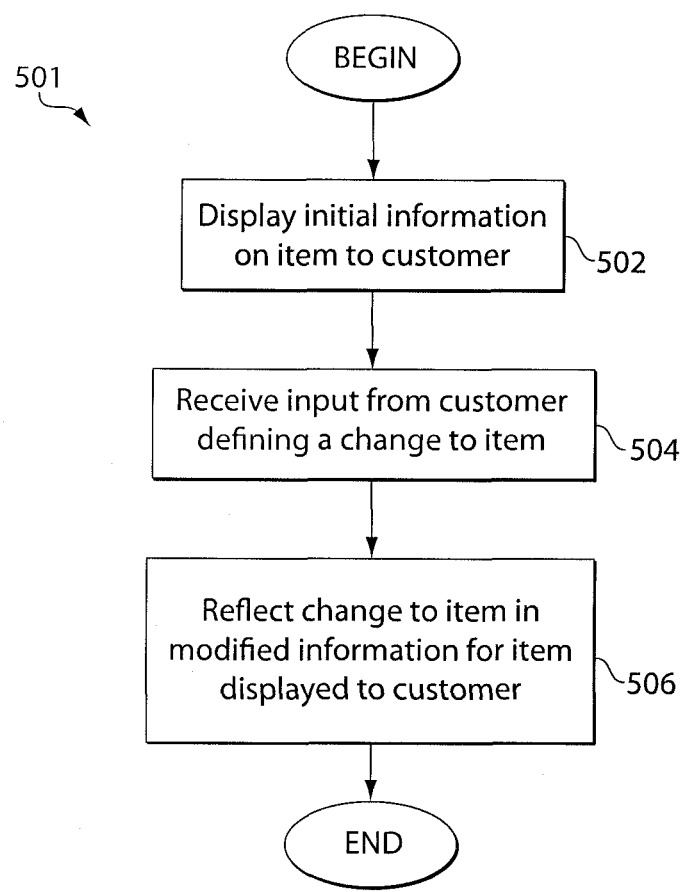
FIG. 5 is a flowchart showing a representative process for reflecting changes to an item in information relating to the item displayed to a customer, in accordance with some embodiments of the invention.

A representative process 501 for updating information for an item when a customer makes changes to the item is shown in FIG. 5. At the start of process 501, initial information for the item is displayed to the customer in act 502. This may be performed in any of numerous ways. On representative screen interface 200 (FIG. 3), the initial information includes an image of the item 210, a list of ingredients 205, nutritional information 315, and price 320. However, it should be appreciated that any suitable information relating to an item may be displayed, as embodiments of the invention are not limited in this respect.

Process 501 then proceeds to act 504, wherein input is received defining a change to the item. Any of numerous forms of input, describing any of numerous changes to the item, may be received. In one example reflected on representative screen interface 300, shown in FIG. 6, a customer has provided input to substitute one type of cheese on the "Bacon Turkey Bravo" sandwich item for another. Specifically, the lack of highlighting at display area 240 indicates that the customer has de-selected "gouda" cheese, and the highlighting at display area 297 indicates that the customer has selected "swiss" cheese instead.

Figure 6:
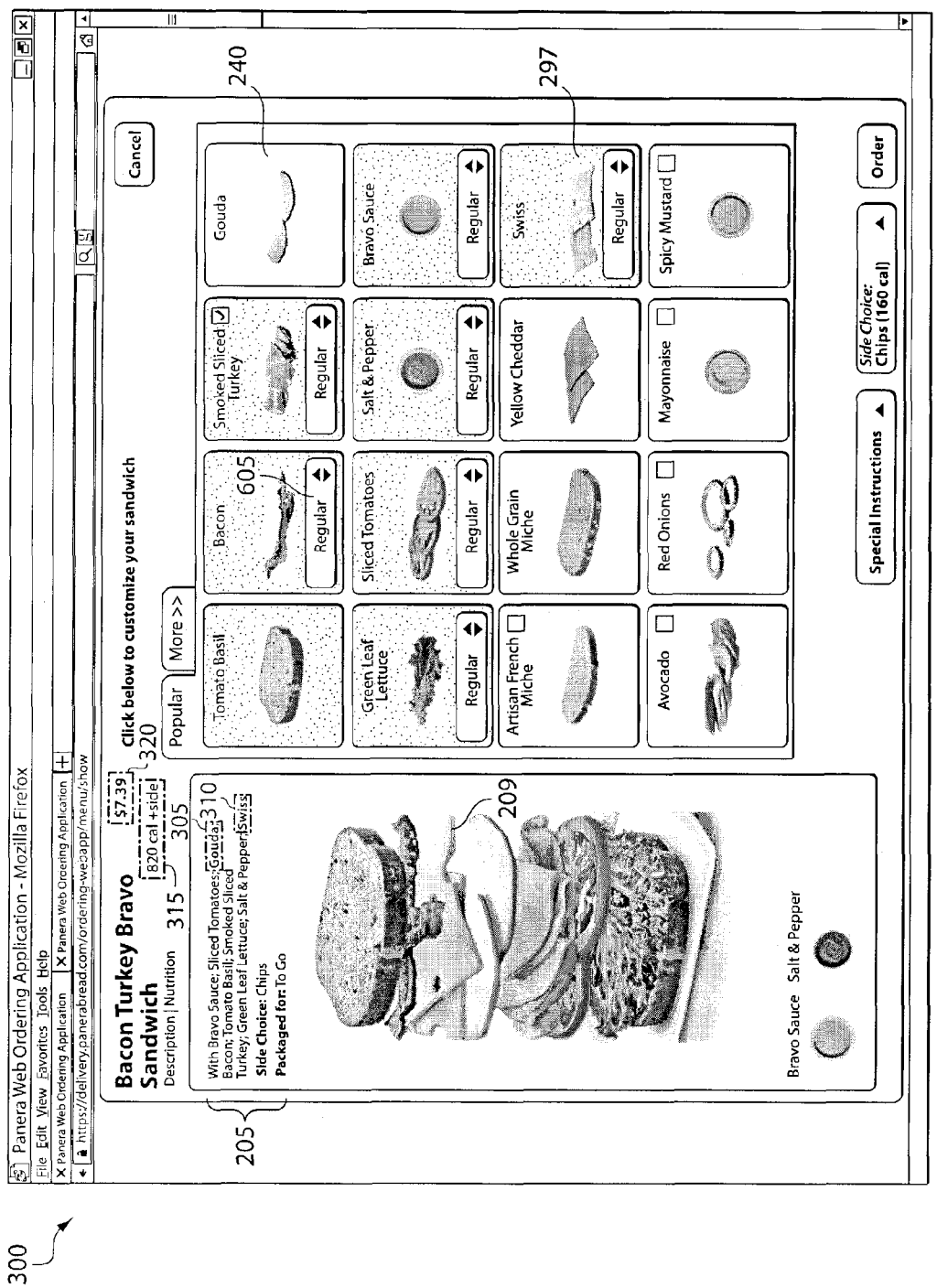
FIG. 6 is a representative screen interface showing changes to information relating to an item upon receiving changes to the item from a customer, in accordance with some embodiments of the invention.

Process 501 then proceeds to act 506, wherein any changes made to the item are reflected in modified information displayed for the item. Changes may be reflected in any of numerous ways. By way of example, FIG. 6 illustrates that the change to the type of cheese may be reflected in a list of ingredients for the item, shown at 205. Specifically, in FIG. 6, the list of ingredients 205 is modified (i.e., from the version of the list which is shown in FIG. 3) so that the text "gouda" is shown in struck-through text (i.e., indicated at 305) and the text "swiss" is shown in text which is formatted differently than the rest of the list, in bold font (i.e., indicated at 310). A change to a list of ingredients may be reflected in any suitable way, such as through text which has a different color, size, and/or format, as embodiments of the invention are not limited in this respect.

FIG. 6 also illustrates that the change to the type of cheese may be reflected in an image of the item. Specifically, in FIG. 6, the overall image of the item includes an image of swiss cheese at 209, rather than the image of gouda cheese which is shown at 209 in FIG. 3. A change to an item's image may be shown in any suitable way, such as by substituting one image for another, visually identifying a newly added ingredient image, etc.

FIG. 6 further illustrates that a change to the type of cheese may be reflected in nutritional information shown for the item. In the depicted example, the nutritional information for the item shown at 315 represents the total number of calories for the item, although any of numerous types of nutritional information may alternatively be shown. It can be seen that the nutritional information shown at 315 in FIG. 5 (i.e., "820 cal+side") reflects a change from the nutritional information shown in FIG. 3 (i.e., "790 cal+side").

Figure 7:
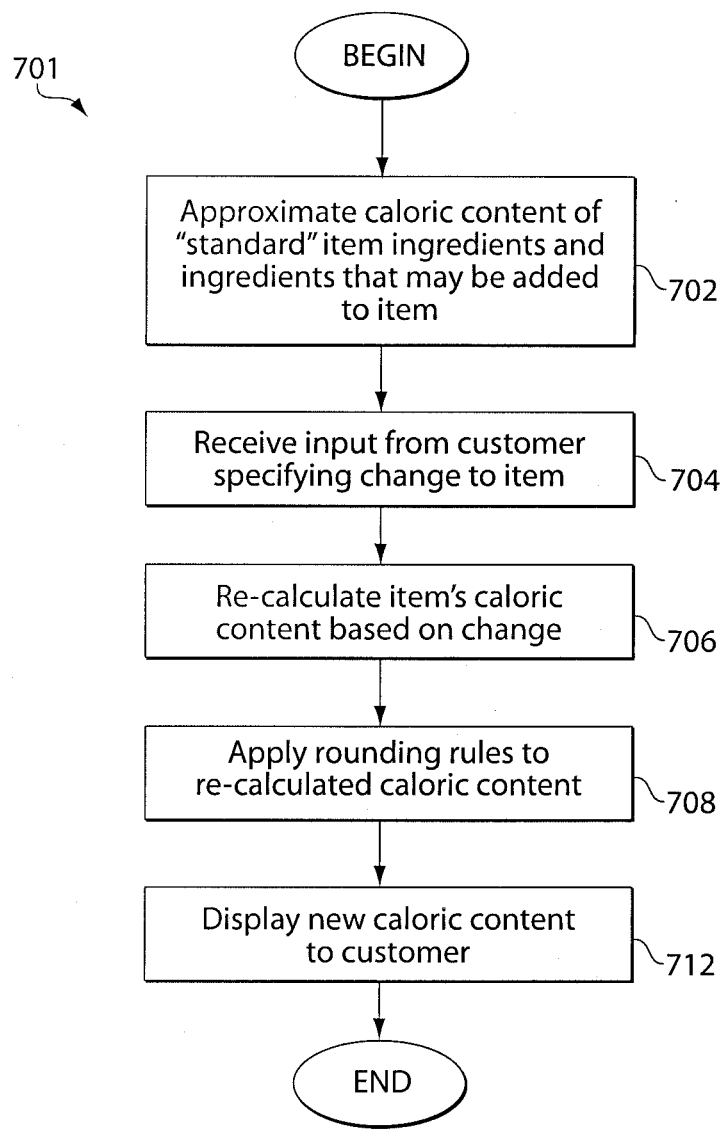
FIG. 7 is a flowchart showing a representative process for calculating changes to an item's nutritional content based on changes to the item by a customer, in accordance with some embodiments of the invention.

In some embodiments of the invention, changes to an item's nutritional content may be determined by recalculating one or more nutritional values based on changes received from the customer. For example, an item's caloric content may be recalculated based on the customer's changes. A representative process 701 for dynamically recalculating an item's caloric content is shown in FIG. 7.

At the start of process 701, the caloric content for the item overall, for each of the item's standard ingredients, and for each ingredient which may be added to the item, is approximated in act 702. For example, the caloric content of the item and for each ingredient may be quantified to a predefined number of decimal places.

Process 701 then proceeds to act 704, wherein input defining a change to the item is received. Any suitable change(s) may be indicated. In the example described above in relation to FIG. 6, the customer has de-selected "gouda" cheese, and selected "swiss" cheese for inclusion on the "Bacon Turkey Bravo" item.

In act 706, this change drives a recalculation of the item's caloric content. This may be performed in any suitable fashion. In one example, the number of calories for an ingredient removed from the item (i.e., determined in act 702) may be subtracted from the total number of calories for the item, and/or the number of calories for an ingredient added to the item may be added to the total number of calories for the item.

Process 701 then proceeds to act 708, wherein rounding rules are applied to the result generated in act 706. Any suitable rounding rules may be applied. For example, rounding rules promulgated by the U.S. FDA relating to calculation of food item nutritional content may be applied.

It should be appreciated that by first calculating an item's caloric content using item and ingredient calorie values, and then applying FDA rounding rules, rather than by calculating the item's caloric content using values to which FDA rounding rules have already been applied (and which may therefore be inaccurate), some embodiments of the invention enable accurate the caloric content of items to be accurately calculated regardless of the types of changes made to the item.

In act 712, the updated caloric content for the item is displayed. As noted above, in the example of FIG. 6, the updated caloric content for the item (i.e., "820 cal+side"), shown at 315, represents a change from that which is shown in FIG. 3 (i.e., "790 cal+side"). The updated caloric content for an item may be displayed in any suitable manner. Process 701 then completes.

Figure 8:
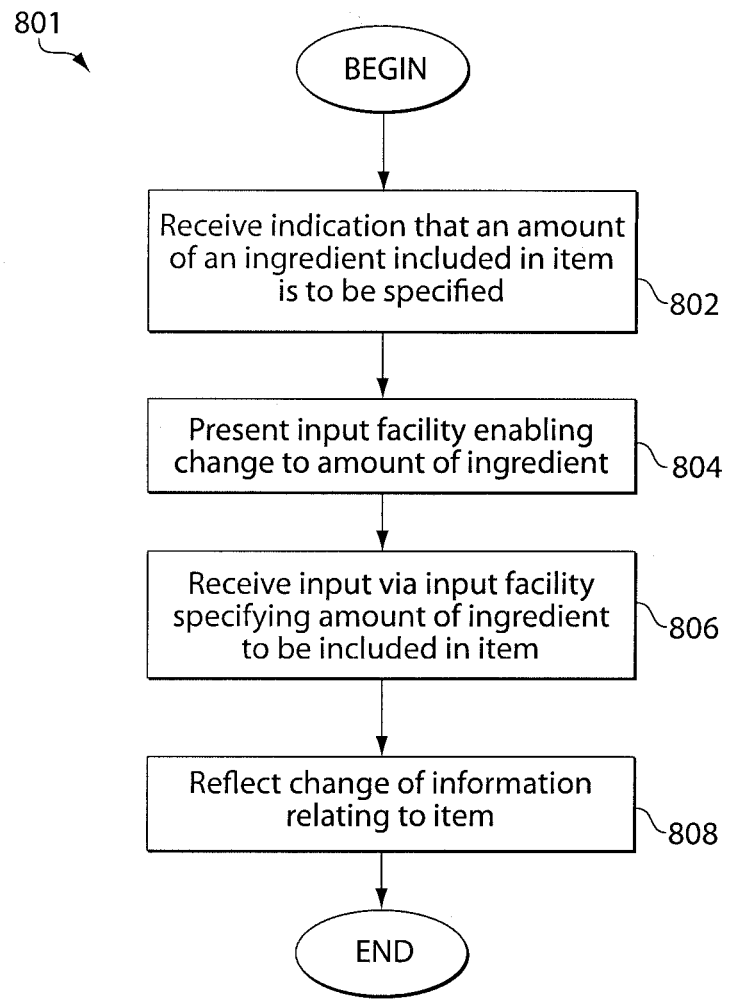
FIG. 8 is a flowchart showing a representative process for receiving a change to an amount of an ingredient in an item, in accordance with some embodiments of the invention.

III. Specifying the Amount of an Ingredient Included in an Item with Minimal Input Some embodiments of the invention provide techniques which enable a customer to select an amount of an ingredient to be included in an item with minimal input. A representative process 801 for providing this capability is shown in FIG. 8.

At the start of process 801, an indication that an amount of an ingredient included in an item is to be specified is received from a customer in act 802. Using the example shown in FIG. 6 to illustrate, a customer may provide input to button 605, indicating a desire to change the amount of bacon included in the "Bacon Turkey Bravo" item.

Process 801 then proceeds to act 804, wherein an input facility is presented to the customer enabling the addition of a variety of amounts of the ingredient. Continuing with the above example, providing input to button 605 may cause menu 505 (shown in FIG. 9A) to appear, which allows the customer to select an amount of bacon to be included in the item. Input is then received defining the amount of the ingredient to be included in the item in act 806. In the example shown, the customer may provide input to button 510 to add "extra" bacon to the item, to button 515 to have the "regular" amount of bacon included on the item, to button 520 to have the amount of bacon reduced to a "light" amount, or to button 525 to have bacon removed from the sandwich.

Figure 9A:
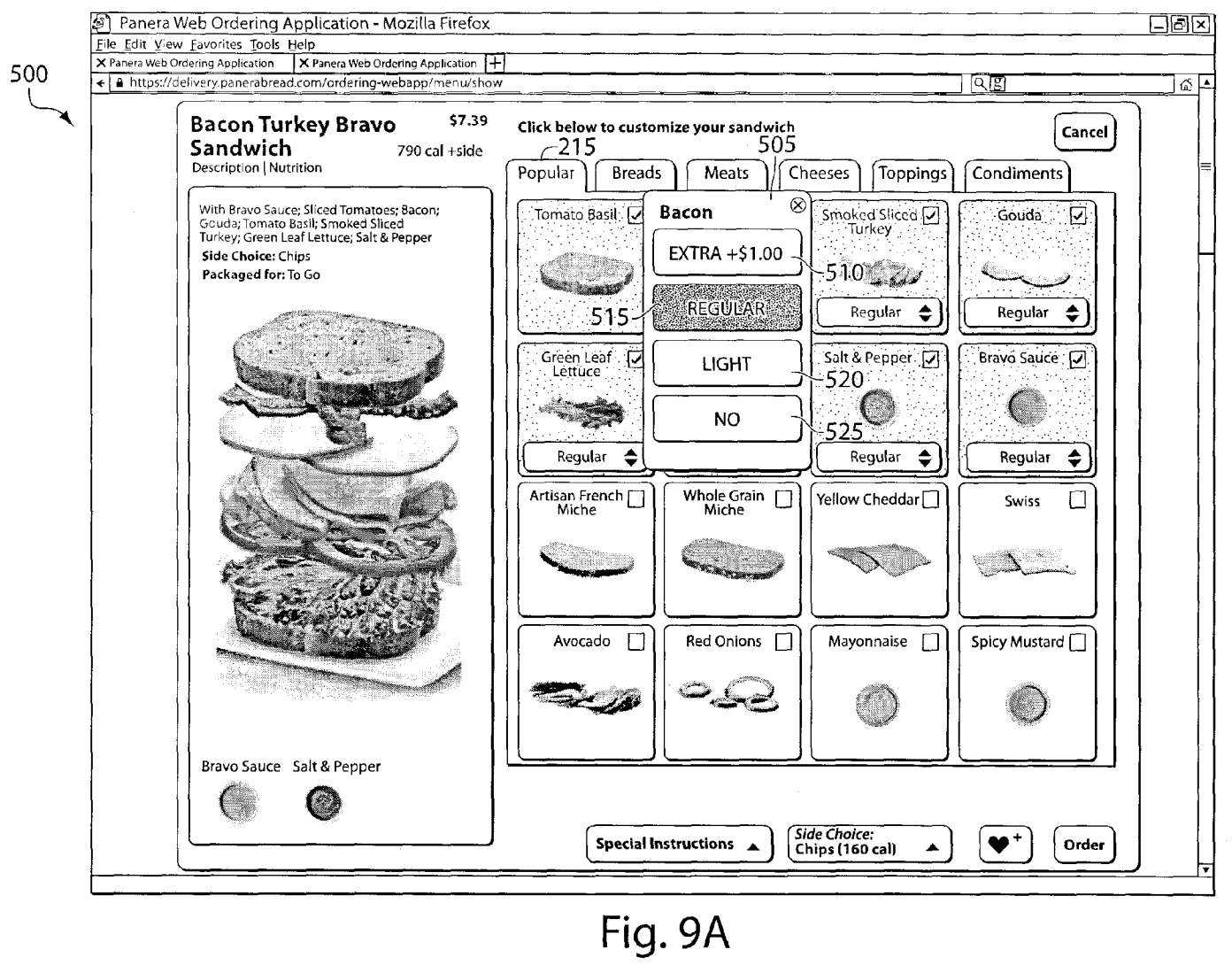
Figure 9B:
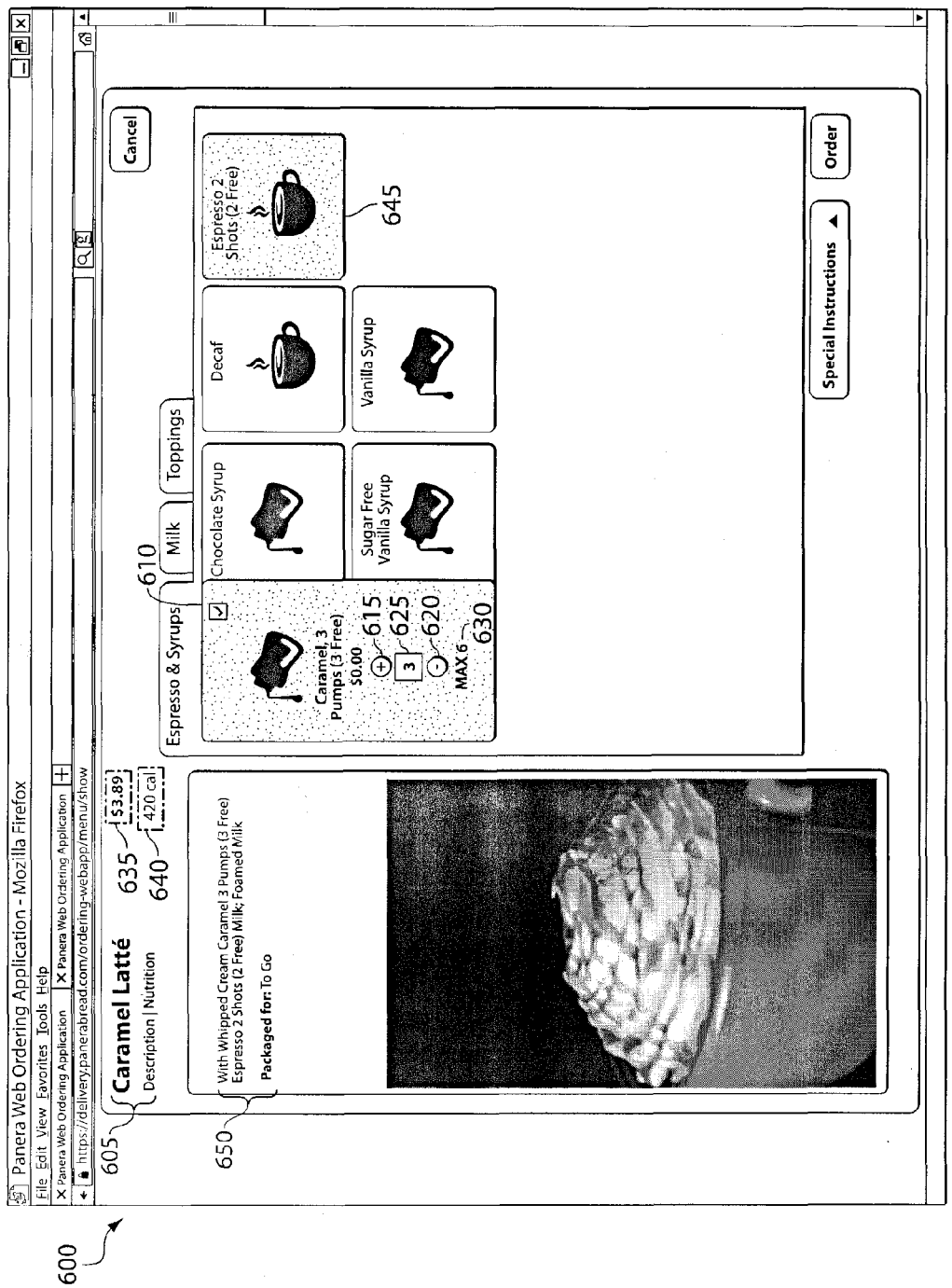
FIG. 9B is a representative screen interface which enables a customer to change the amount of an ingredient in an item, in accordance with some embodiments of the invention.

An alternative to the input facility shown in FIG. 9A is shown in FIG. 9B. Representative screen interface 600 depicts a menu 610 which is displayed when a user provides input indicating a desire to change the quantity of "pumps" (i.e., portions) of caramel to be included in a caramel latte. Input facility 610 allows the customer to add to the pumps included by providing input to "+" button 615, and to subtract pumps by providing input to "−" button 620. The number of pumps which are to be included in the drink are shown at 625, and a maximum number of pumps that may be included is shown at 630.

Process 801 then proceeds to In act 808, wherein any change to the amount of an ingredient in the item is reflected in information relating to the item. For example, adding to and/or subtracting from the number of portions of an ingredient may cause information relating to the item to be updated, such as the item's price (shown at 635), the number of calories in the item (shown at 640), and a list of the item's ingredients (shown at 650). Representative process 801 then completes.

It should be appreciated that by allowing a customer to specify an amount of an ingredient to be included in an item with minimal input, some embodiments of the invention may enhance the customer's satisfaction with the ordering process overall.

Figure 10:
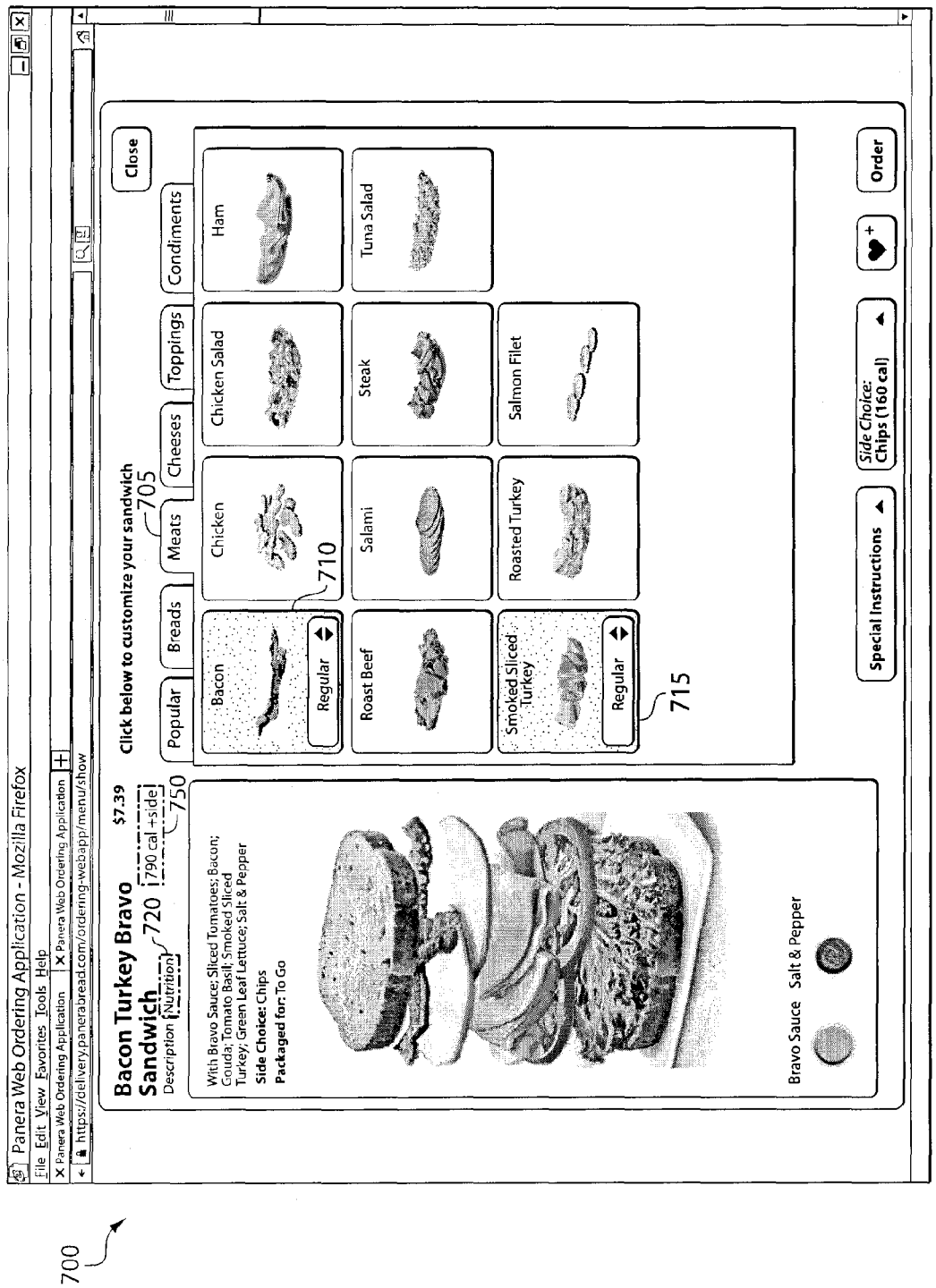
FIG. 10 is a representative screen interface showing changes to an item's nutritional content resulting from changes performed by a customer, in accordance with some embodiments of the invention.

Some embodiments of the invention may present detailed nutritional information relating to an item to a customer, and update this information dynamically if the customer makes a change to the item. In this respect, representative screen interface 700, shown in FIG. 10, shows that the standard meat ingredients for the "Bacon Turkey Bravo" item include "bacon" and "smoked sliced turkey" (as indicated by the highlighting of display areas 710 and 715). Nutritional information shown at 750 indicates that this item has 790 calories. By providing input to link 720, the customer may reveal more detailed nutritional information, as depicted by representative screen interface 800 shown in FIG. 11. Specifically, display portion 805 is revealed when the customer provides input to link 720, providing detailed nutritional information for the item in tabular form, indicating that the standard version of the item has 790 calories (as shown at 810), 85 milligrams of cholesterol (as shown at 815), 2800 milligrams of sodium (as shown at 820), 83 grams of carbohydrates (as shown at 825), 6 grams of sugar (as shown at 830) and 52 grams of protein (as shown at 835).

Figure 11:
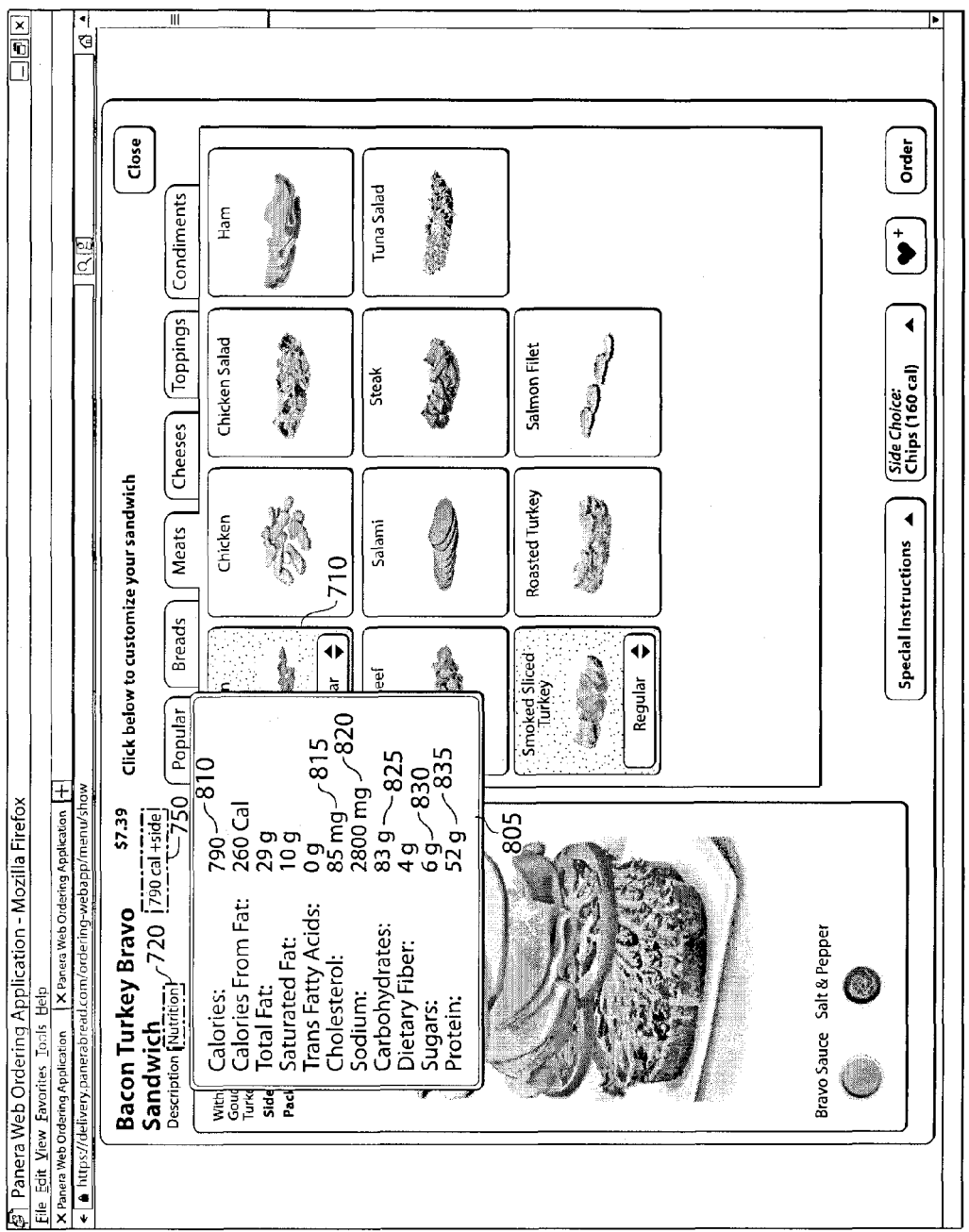
FIG. 11 is a representative screen interface showing detailed nutritional information for an item prior to customization of the item by a customer, in accordance with some embodiments of the invention.
Figure 13:
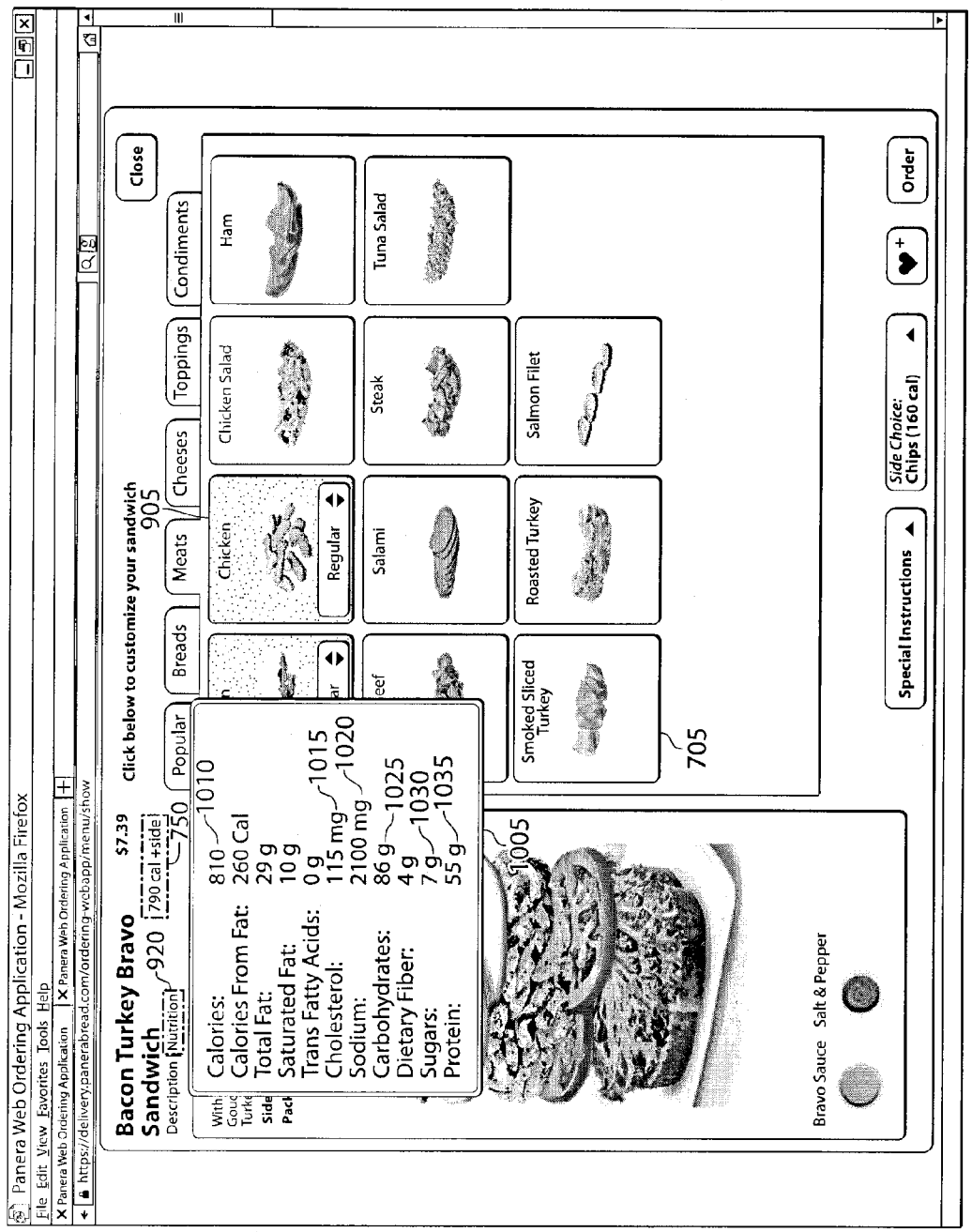
FIG. 13 is a representative screen interface showing changes to detailed nutritional information for an item after customization of the item by a customer, in accordance with some embodiments of the invention.

Representative screen interface 900 in FIG. 9 shows the customer having changed the standard version of the item by omitting "smoked sliced turkey" (as indicated by the lack of highlighting of display area 705) and adding "chicken" (indicated by the highlighting of display area 905), and these changes are reflected in the list of ingredients at 910 and 915, respectively. The number of calories for the item is shown at 750, indicating that the number of calories has risen from 790 calories (as shown in FIG. 11) to 810 calories. By providing input to link 920, the customer causes display portion 1005 (FIG. 13) to be shown, which provides detailed nutritional information for the changed version of the item. Specifically, this information shows that changing the item has caused the total number of calories to rise from 790 to 810 (as shown at 1010), increased the total cholesterol from 85 milligrams to 115 milligrams (as shown at 1015), reduced the total sodium from 2800 milligrams to 2100 milligrams (as shown at 1020), increased the total carbohydrates from 83 grams to 86 grams (as shown at 1025), increased the total sugar from 6 grams to 7 grams (as shown at 1030) and increased the total protein from 52 grams to 55 grams (as shown at 1035). By showing detailed nutritional information for an item as it is changed, some embodiments of the invention may enable to the customer to see the nutritional effects of the changes, and to make informed decisions about their food intake.

IV. Updating Item Images in Response to Changes

Figure 14:
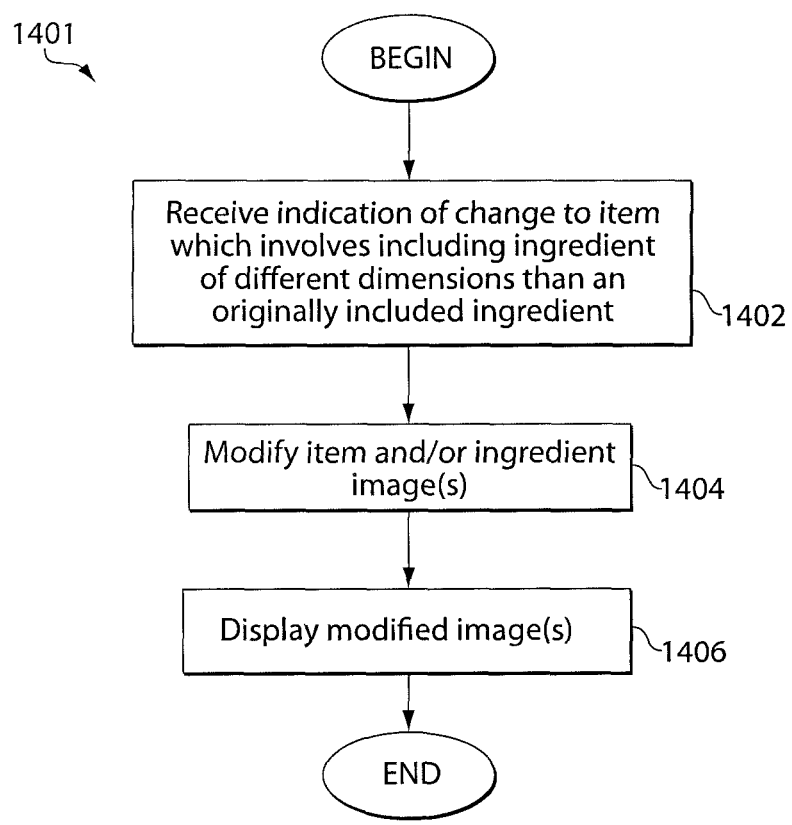
FIG. 14 is a flowchart showing a representative process for creating and displaying an accurate graphical depiction of an item after customization of the item by a customer, in accordance with some embodiments of the invention.

Information other than the nutritional content of an item may be updated dynamically when a customer makes changes to the item. For example, in some embodiments, images of the item and/or individual ingredients may be dynamically updated when a customer makes changes to the item, so as to clearly convey those changes to the customer. In this respect, some embodiments of the invention provide for images of an item and/or its ingredients to be re-scaled when a customer indicates a change is to be made to the item, to ensure that the images accurately depict what will be delivered to the customer when the order is placed. A representative process 1401 for re-scaling and displaying item and/or ingredient images is shown in FIG. 14.

Figure 15:
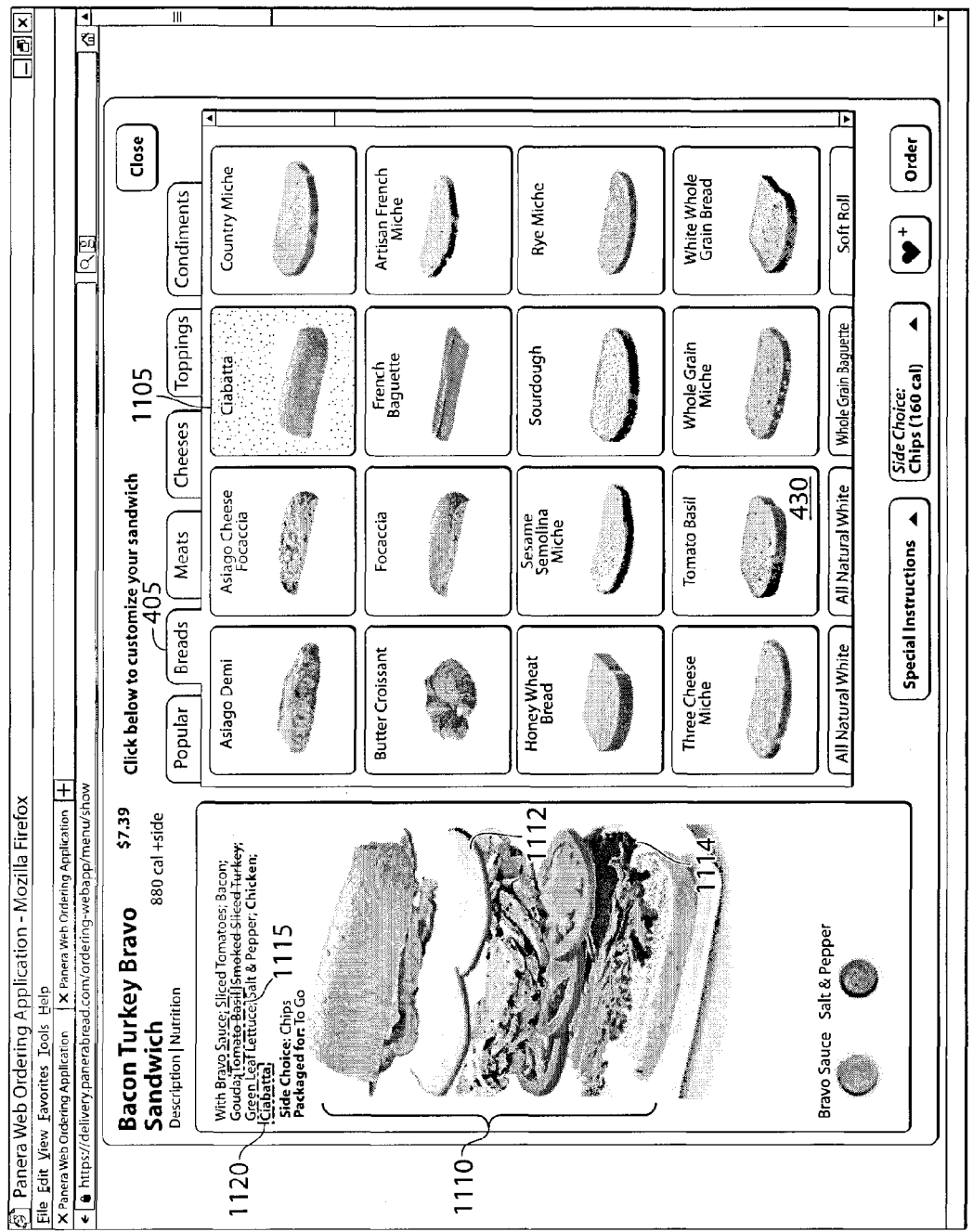
FIG. 15 is a representative screen interface showing an image of an item which has been customized by a customer, in accordance with some embodiments of the invention.

At the start of process 1401, in act 1402, an indication is received of a change to an item which involves including an ingredient having different dimensions than an originally included ingredient. Any of numerous types of changes may be indicated, as embodiments of the invention are not limited in this respect. For example, if the item is a sandwich, then an indication that a type of bread having different dimensions than the bread which is used to make the standard version of the sandwich may be indicated. An example is shown in FIG. 15, in which a customer has indicated via representative screen interface 1100 that the "Bacon Turkey Bravo" sandwich should be made with "ciabatta" bread (as indicated by the highlighting of display portion 1105) rather than "tomato basil" bread (as indicated by the lack of highlighting of display portion 430).

Figure 12:
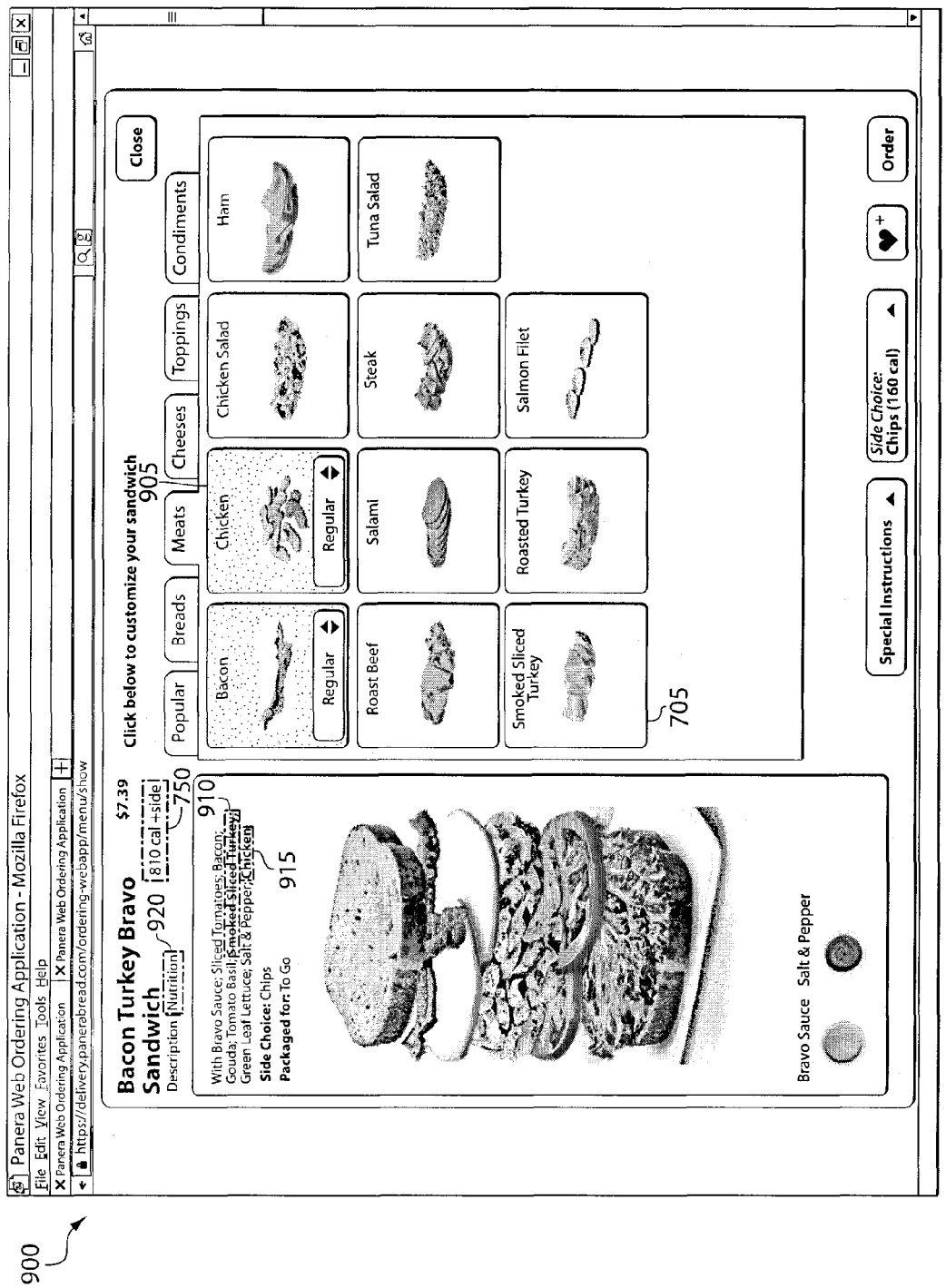
FIG. 12 is a representative screen interface showing changes to information relating to an item after customization of the item by a customer, in accordance with some embodiments of the invention.

Process 1401 then proceeds to act 1404, wherein item and/or ingredient images are modified (e.g., re-scaled, rearranged, etc., as appropriate given the change), and then to act 1406, wherein the modified images are displayed. In this example, because ciabatta bread generally has different dimensions and a different (i.e., more oblong) shape than tomato basil bread, the images of various ingredients are re-scaled in item image 1110 to accurately depict what a sandwich made with ciabatta bread will look like. For example, it can be seen by comparing the images of the item shown in FIGS. 12 and 15 that cheese image 1112 and tomato image 1114 have been re-scaled and spaced differently in FIG. 15, so as to approximate the shape and dimensions of a slice of ciabatta bread, rather than a slice of tomato basil bread.

It should be appreciated that embodiments of the invention may cause images to be modified in any suitable fashion, and that the modification of item/ingredient images is not limited to sandwich offerings. For example, some embodiments of the invention may provide for spacing images of salad ingredients based at least in part on how far from the top of the salad each ingredient lies. In some embodiments, images for some ingredients may be spaced based at least in part on the presence or absence of other ingredients in, and their placement within, the salad (e.g., images of walnuts may be spaced differently if there are chicken images "underneath" the walnut images, so as to not obscure the chicken images), and/or to accomplish other goals. At the completion of act 1406, representative process 1401 completes.

V. Evaluating Item Changes

Figure 16:
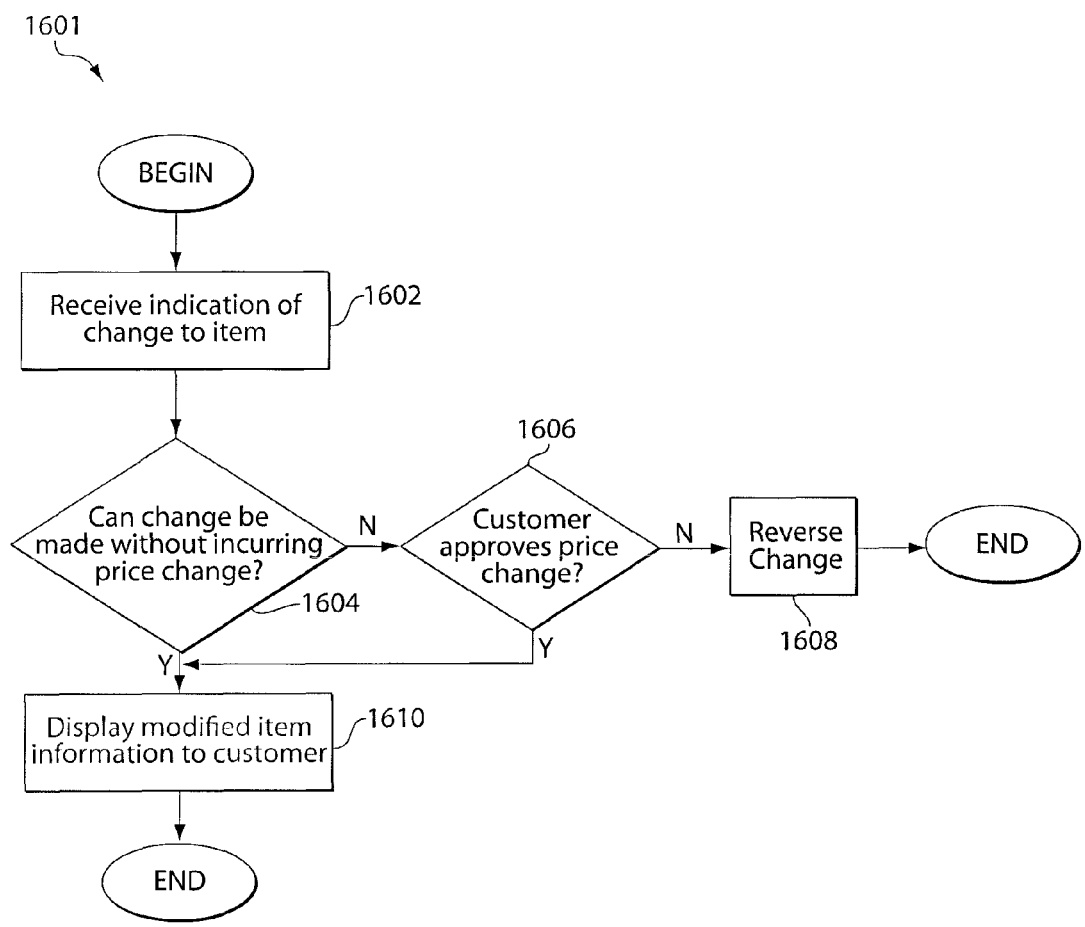
FIG. 16 is a flowchart showing a representative process for evaluating changes to an item attempted by a customer, in accordance with some embodiments of the invention.

In some embodiments of the invention, techniques are employed to regulate the number and/or nature of changes which a customer may make to an item. Representative process 1601, shown in FIG. 16, may be performed to evaluate item changes requested by a customer. This representative process assumes no restrictions on the number and type of changes that a customer may make to an item, except that some changes may incur a price change. However, it should be appreciated that variations on this representative process are possible, such as variations wherein operational, financial and/or other concerns may restrict the number and/or type of changes that a customer may make. Embodiments of the invention may be implemented in any of numerous ways.

At the start of representative process 1601, an indication of a change to an item is received from a customer in act 1602. In act 1604, a determination is made whether the requested change is one which may be made without incurring a price change. This determination may be made in any of numerous ways. In some embodiments, each type of change that may potentially be made to an item may be assigned a "weight," and a maximum aggregate change weight may be defined for the item. In these embodiments, the determination in act 1604 may involve determining whether the change indicated in act 1602 causes the maximum aggregate change weight to be exceeded. Of course, any of numerous other techniques may be used to determine whether a change may be made without incurring a price change. For example, a predetermined maximum number of changes may be established, and act 1604 may involve determining whether the maximum number has been exceeded.

If it is determined in act 1604 that the requested change may not be made without a price change, then process 1601 proceeds to act 1606, wherein a determination is made whether the customer approves the price change. If it is determined that the customer does not approve of the price change, then the change indicated in act 1602 is reversed in act 1608, and process 1601 then completes.

If it is determined that it is determined in act 1604 that the requested change may be made without a price change, or if it is determined in act 1606 that the customer approves the price change, then process 1601 proceeds to act 1610, wherein modified item information which reflects the change indicated in 1602 is displayed. Process 1601 then completes.

Figure 17:
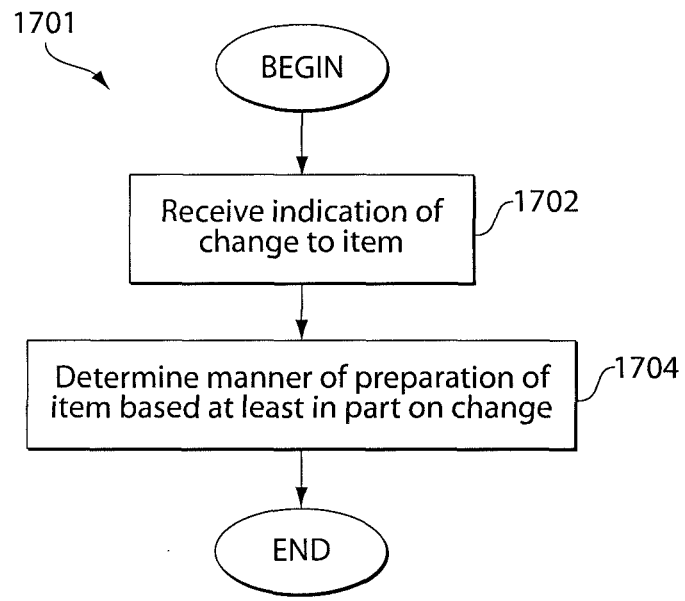
FIG. 17 is a flowchart showing a representative process for determining a manner of preparing an item based at least in part on customization of the item performed by the customer, in accordance with some embodiments of the invention.

In some embodiments of the invention, the manner in which a food item is prepared (e.g., the order in which an item's ingredients are combined, the placement of ingredients within the item, and/or other aspects of the item's preparation) may be influenced by changes to the item which are requested by the customer. A representative process 1701, shown in FIG. 17, may be performed to determine whether and how the manner in which an item is prepared is to be modified based on changes to the item requested by the customer.

At the start of process 1701, an indication of a change to the item is received in act 1702. For example, an indication that one ingredient of a sandwich is to be substituted for another may be received. Process 1701 then proceeds to act 1704, wherein a manner of preparation for the item is determined based at least in part on the received indication. For example, act 1704 may involve determining whether the order in which the item's ingredients are combined, the placement of ingredients within the item, and/or other preparation aspects are to be changed (e.g., from a manner of preparation defined for the standard version of the item). In act 1706, the results of the determination in act 1704 are displayed, such as to food preparation staff as a recipe for preparing the item. Process 1701 then completes.

VI. Accessing Previous Orders

Figure 18:
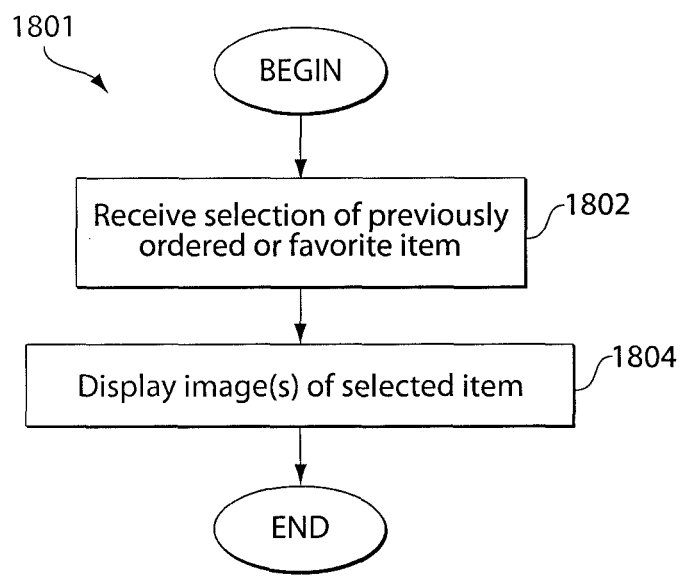
FIG. 18 is a flowchart showing a representative process for displaying information on a previously ordered item to a customer, in accordance with some embodiments of the invention.
Figure 19:
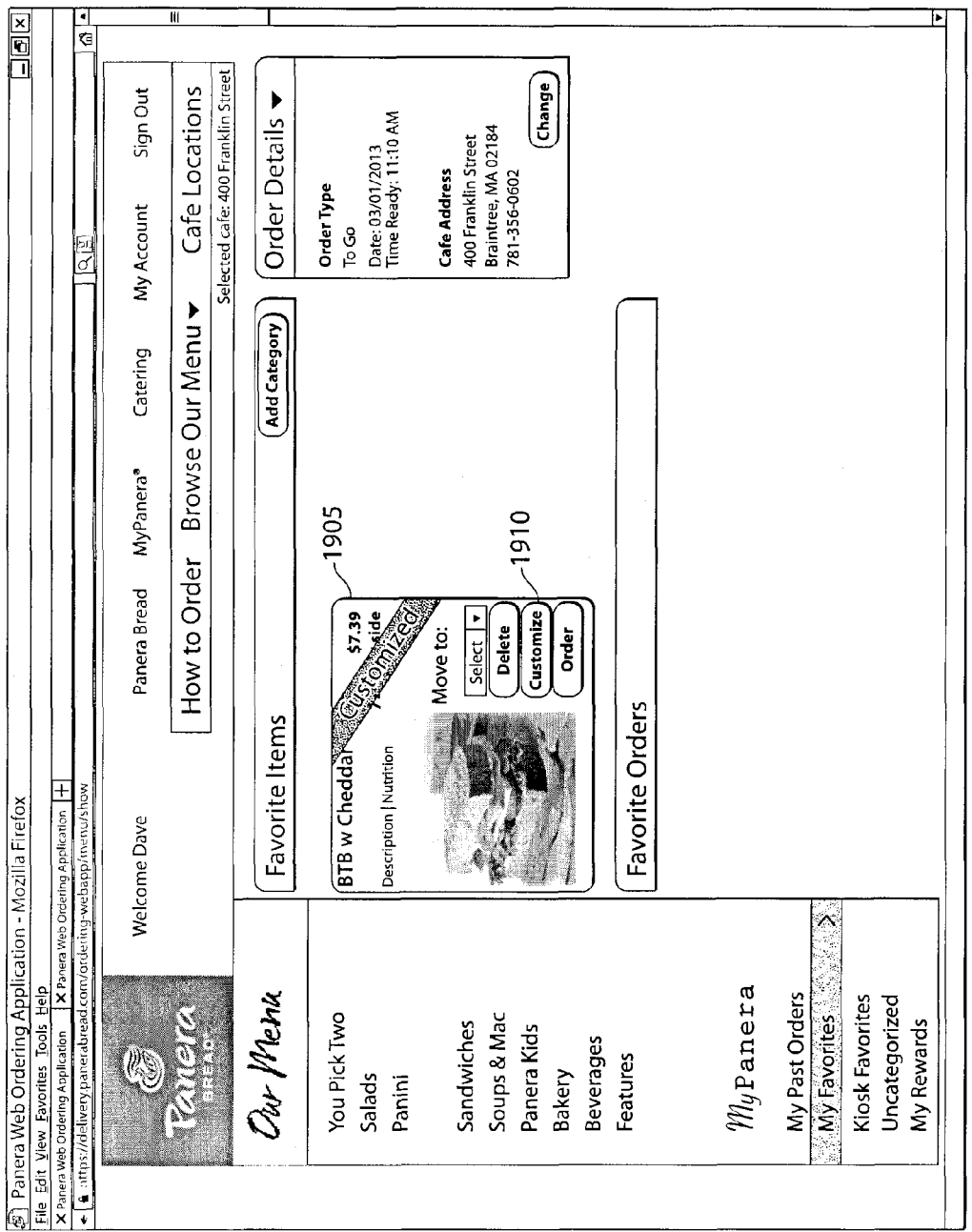
FIG. 19 is a representative screen interface enabling a customer to select a previously ordered item for customization, in accordance with some embodiments of the invention.

In some embodiments of the invention, a customer may be provided with easy access to previously ordered items and/or items designated as "favorites." Further, when a customer indicates a desire to re-order a previously ordered or favorite item, some embodiments of the invention may cause an image of the item to be re-displayed to the customer to remind the customer of the item's ingredients, thereby increasing order accuracy. A representative process 1801 for displaying an image of a previously ordered or favorite item is depicted in FIG. 18. At the start of process 1801, a customer's selection of a previously ordered or favorite item is received. A customer may indicate a selection of a previously ordered or favorite item via representative screen interface 1900, shown in FIG. 19. Specifically, the customer may provide input to button 1910 in display area 1905 to indicate a selection of the corresponding (i.e., "BTB w Cheddar") item.

Figure 20:
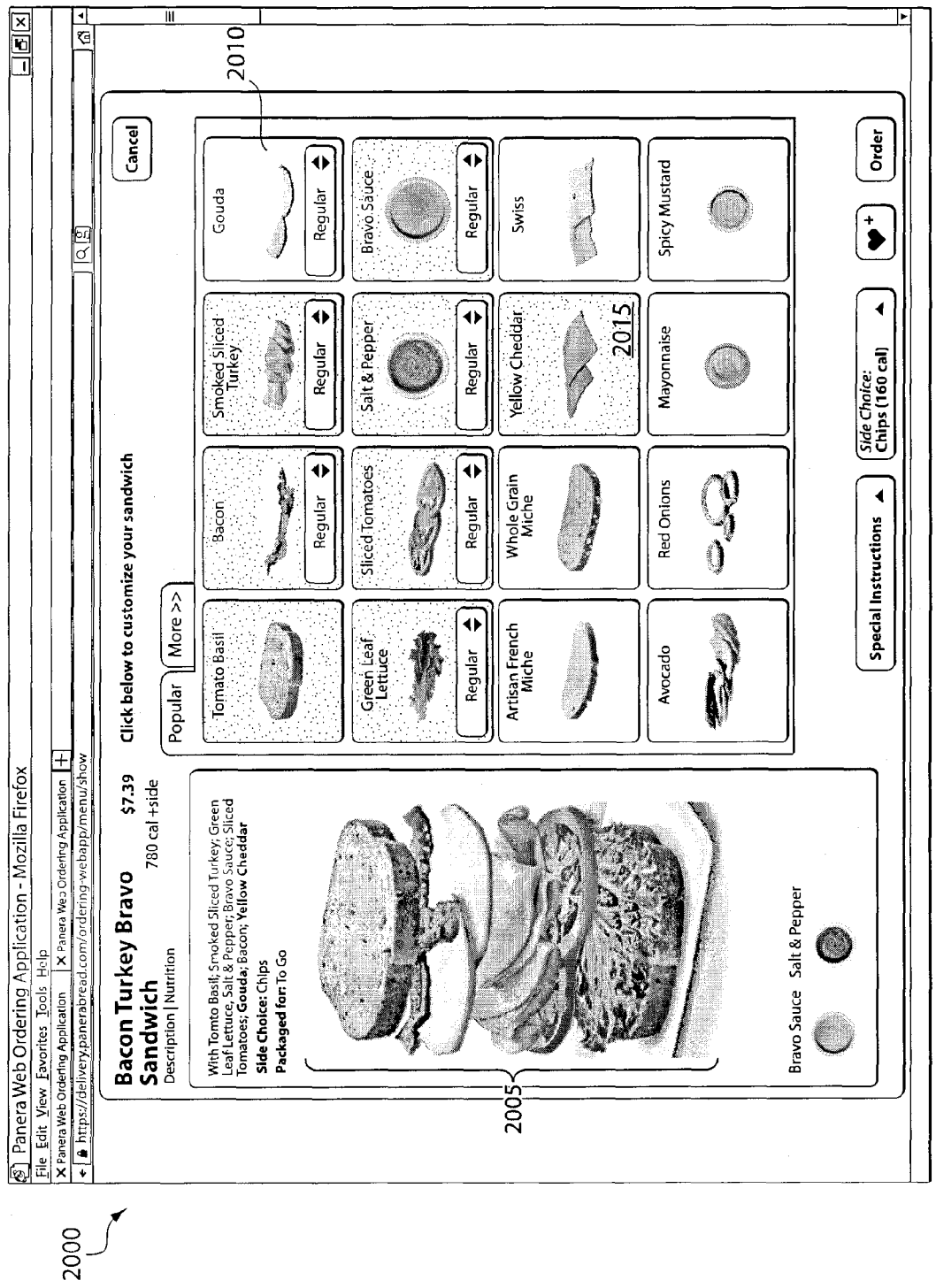
FIG. 20 is a representative screen interface enabling a customer to customize a previously ordered item, in accordance with some embodiments of the invention.

Process 1801 then proceeds to act 1804, wherein one or more images of the item and/or its ingredients are displayed. A representative screen interface 2000, which presents images 2005, is shown in FIG. 20. In the example shown, images 2005 represent the item's ingredients as customized by the customer (i.e., to add "yellow cheddar" cheese, as indicated by the highlighting of display portion 2015, and to omit "gouda" cheese, as indicated by the lack of highlighting of display portion 2010). Images for an previously ordered or favorite item, and/or its ingredients, may be rendered in any suitable ways, such as by retrieving the images from storage, or dynamically re-generating the image (e.g., based on a list of the item's ingredients, and/or other information). At the completion of act 1804, process 1801 completes.

VII. Customizing Item Components

Figure 21:
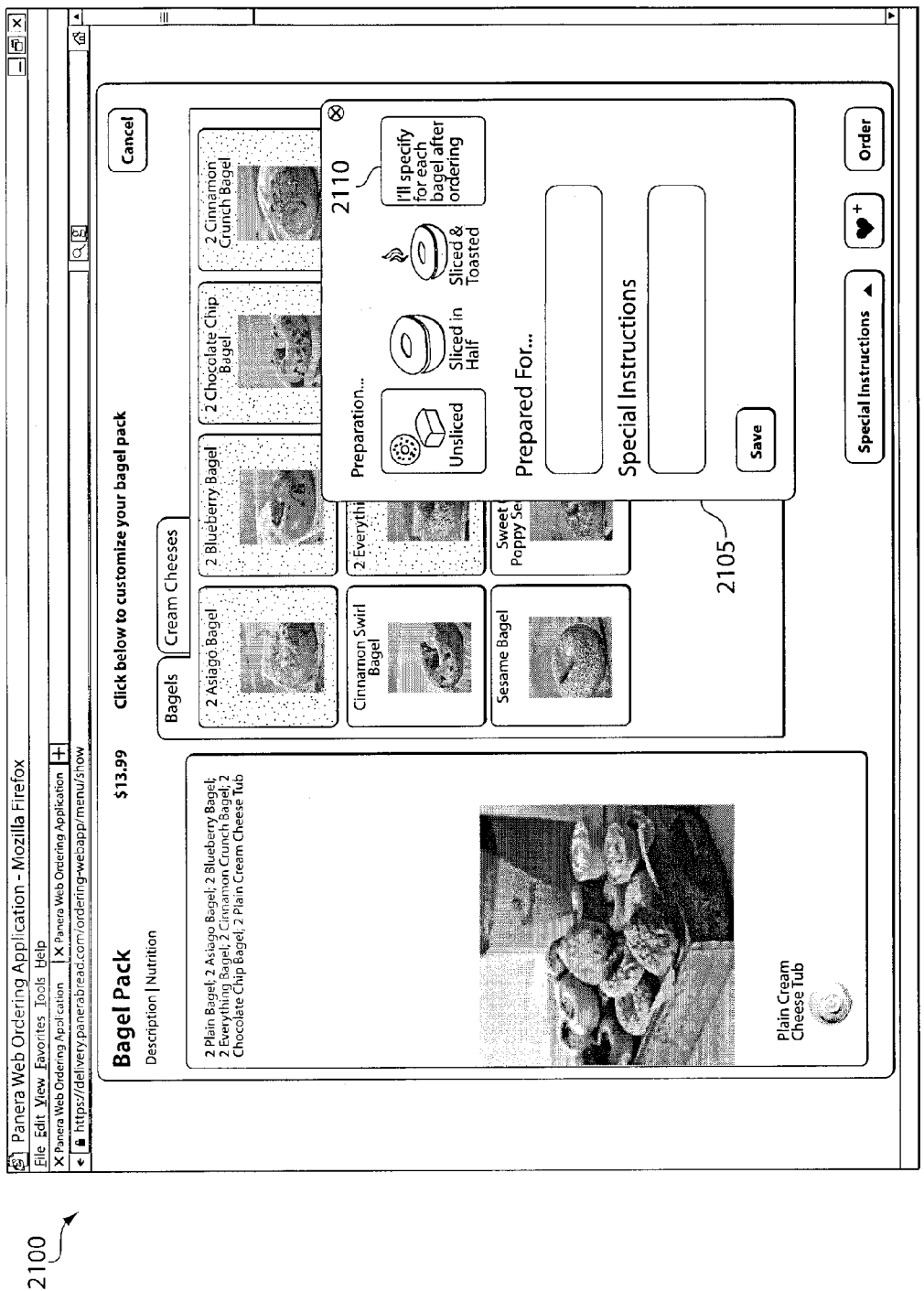
FIG. 21 is a representative screen interface enabling a customer to select an item for customization of components of the item, in accordance with some embodiments of the invention.
Figure 22:
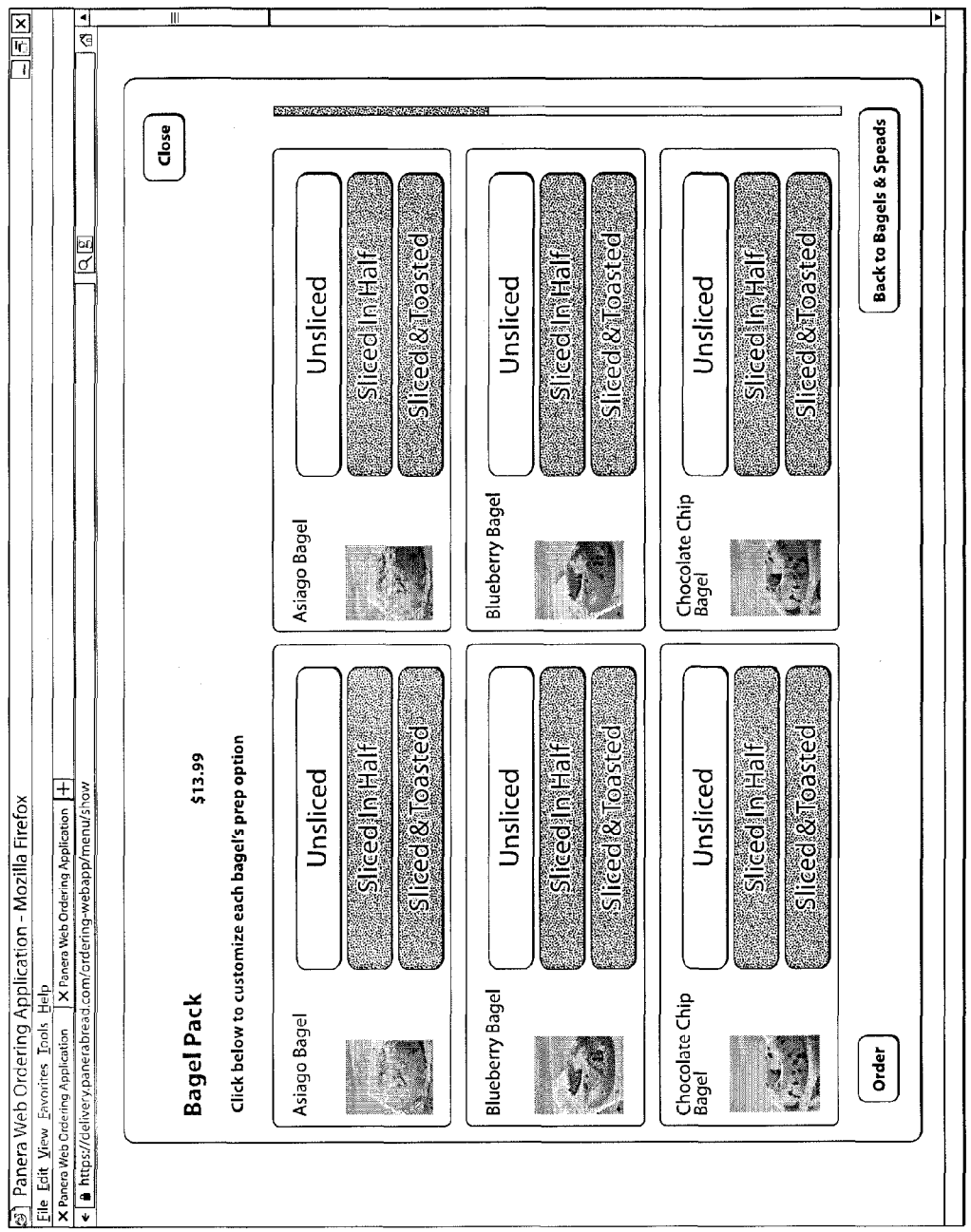
FIG. 22 is a representative screen interface enabling a customer to customize individual components of the item, in accordance with some embodiments of the invention.

In some embodiments of the invention, a customer may customize not only the items that constitute an order, but also the components of a particular item. A representative screen interface 2100 enabling a customer to customize the components of an item is shown in FIG. 21. Specifically, the screen interface shown in FIG. 21 allows a customer to customize the manner in which each individual bagel within a "bagel pack" is prepared, packaged and/or delivered to the customer. Once the customer selects the types of bagels that are to comprise the bagel pack using screen interface 2100, display portion 2105 enables the customer to indicate that various aspects of each individual bagel's preparation, packaging and/or delivery will be specified by the customer, by providing input to button 2110. Providing such input causes representative screen interface 2200, shown in FIG. 22, to be displayed. On screen interface 2200, a display portion is allotted to each bagel in the pack, and the customer is allowed to specify how each bagel is to be prepared ("unsliced," "sliced in half," and "sliced & toasted" in the example shown). Of course, embodiments of the invention are not limited to providing the particular preparation choices shown. Other display portions and/or screen interfaces may enable the customer to specify how individual bagels are packaged or delivered (e.g., that one bagel is to be eaten in the restaurant, while others are packaged "to go," etc.). Any suitable options relating to preparation, packaging and/or delivery may be provided.

VIII. Ordering Process Enhancements

Figure 23A:
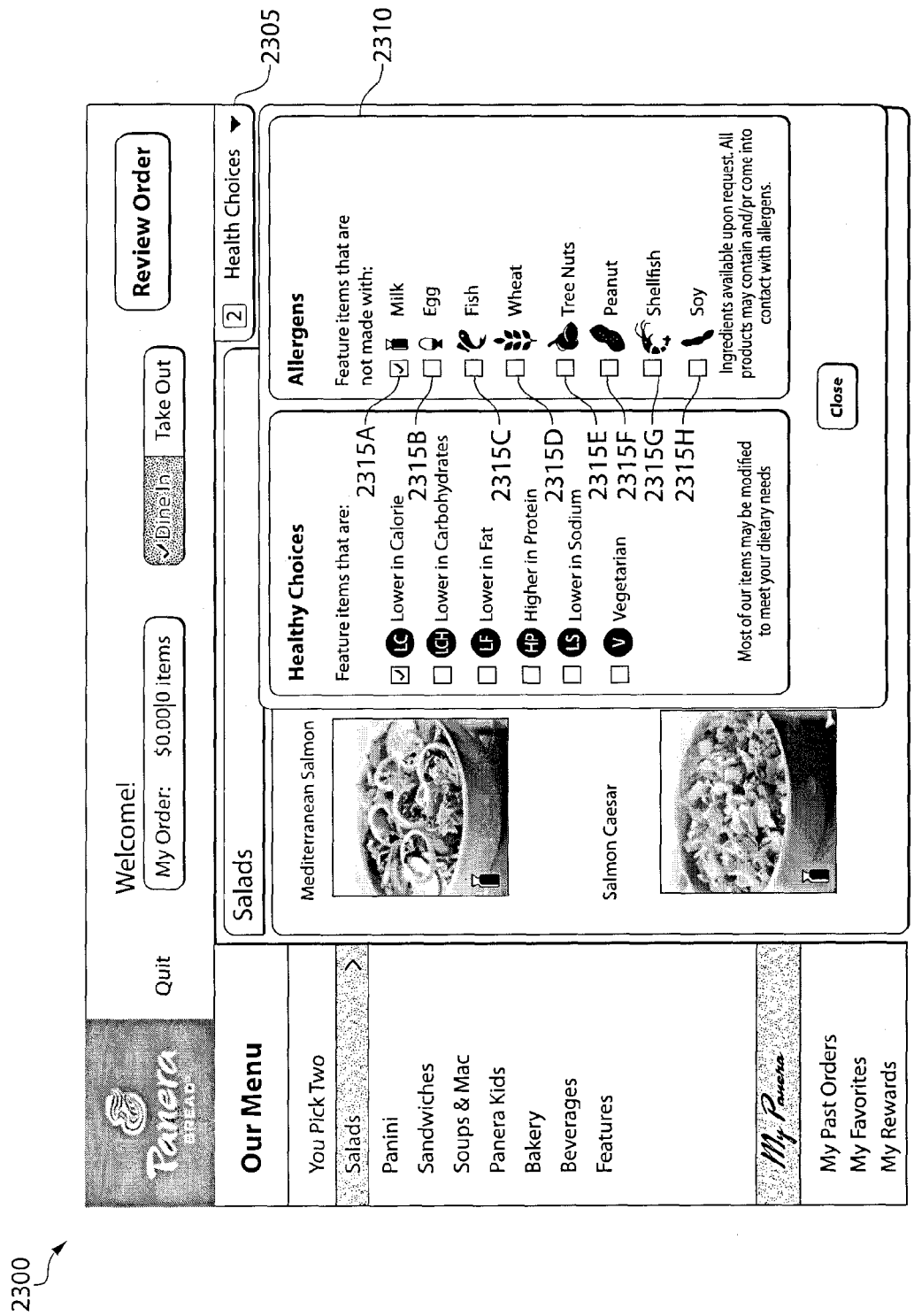
FIG. 23A is a representative screen interface enabling a customer to select allergens to which he/she may have an aversion, in accordance with some embodiments of the invention.

Some embodiments of the invention may provide for visually identifying for the customer items containing certain ingredients, such as those which are allergens, or those which are related to particular dietary goals (e.g., low-calorie options, gluten-free options, etc.). These ingredients may be identified, for example, by prompting the customer to select them, such as from a list. Representative screen interface 2300, shown in FIG. 23, enables a customer to identify allergens that affect them or members of their family. Specifically, in this example, by providing input to button 2305, the customer may cause menu 2310 to appear, which allows him/her to select the allergens that affect them. In particular, by checking box 2315A, the customer may indicate an aversion to milk, checking box 2315B allows the customer to indicate an aversion to egg, checking box 2315C allows the customer to indicate an aversion to fish, checking box 2315D allows the customer to indicate an aversion to wheat, checking box 2315E allows the customer to indicate an aversion to tree nuts, checking box 2315F allows the customer to indicate an aversion to peanuts, checking box 2315G allows the customer to indicate an aversion to shellfish, and checking box 2315H allows the customer to indicate an aversion to soy. Any number of allergens may be selected by a customer, to reflect aversions to those allergens by the customer, and/or others associated with him/her. For example, a mother may use representative screen interface 2350 to indicate that she has a milk allergy, and that her daughter has a peanut allergy.

Figure 23B:
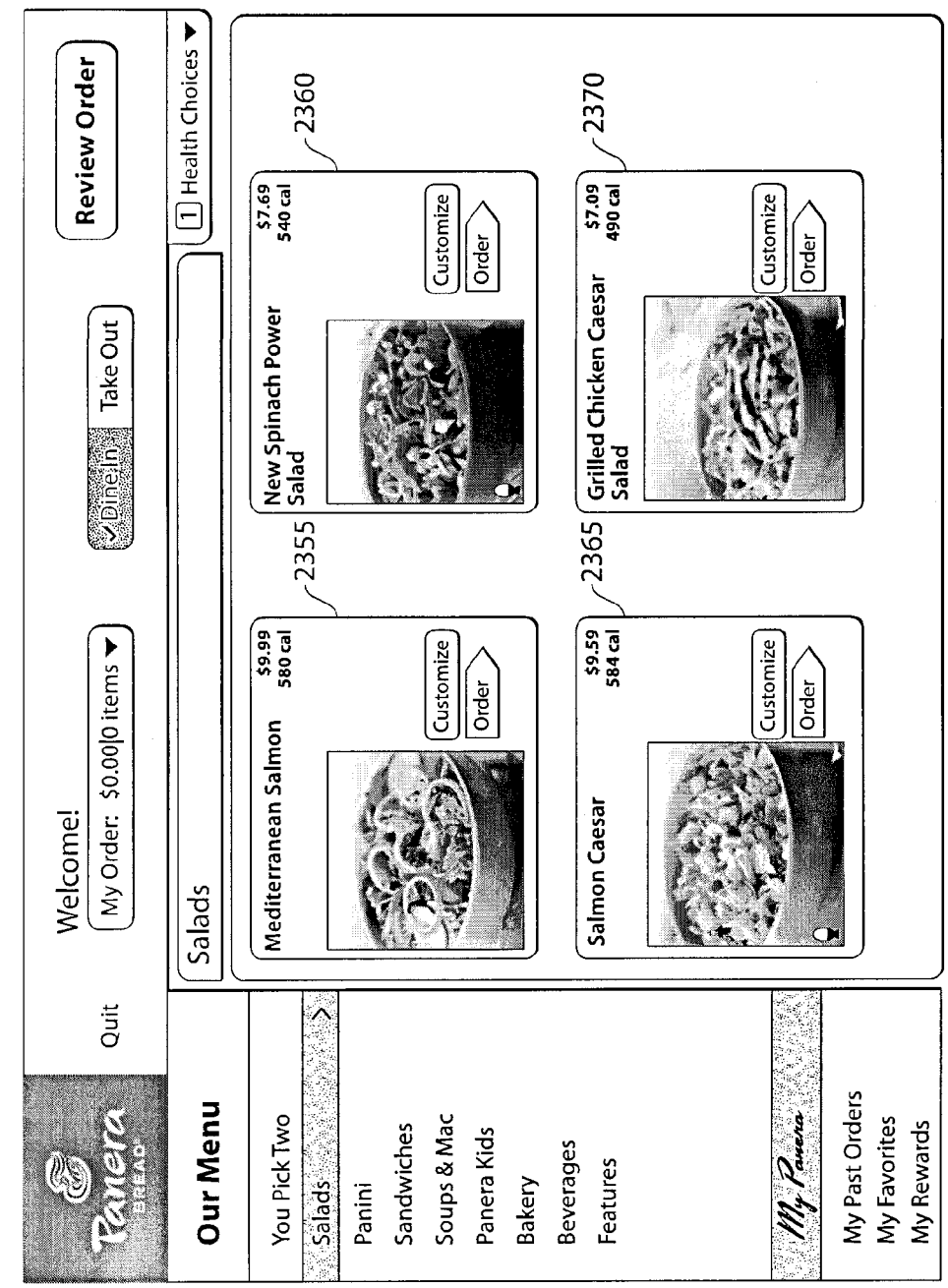
FIG. 23B is a representative screen interface which identifies items containing potential allergens, in accordance with some embodiments of the invention.

FIG. 23B shows a representative screen interface 2350 which may be displayed to a customer after he/she has indicated an aversion to at least one of the allergens listed in menu 2310. Screen interface 2350 includes display portions 2355, 2360, 2365 and 2370. It can be seen that display portions 2360, 2365 and 2370 are "grayed out," providing a visual cue to the customer that the corresponding items contain one or more of the selected allergens (i.e., in the example reflected in FIG. 23A, milk). Of course, any suitable technique for providing such a visual cue may be used, as embodiments of the invention are not limited to the specific example shown. For example, items containing selected allergens may be shown in display portions with differently formatted text and/or image data.

In FIG. 23B, it can be seen that "customize" and "order" buttons are provided in display portions 2360, 2365 and 2370, indicating that the customer may still select these items for inclusion in an order, even though the items contain ingredients to which the customer has indicated an aversion. In this respect, it should be appreciated that some embodiments of the invention seek to provide customers with the information needed to make informed decisions about the food items they order, while also providing maximum order flexibility. One reason for this is that, as described above, a customer may use menu 2310 on screen interface 2300 to indicate that she personally has an aversion to one allergen (e.g., milk), and that a family member has an aversion to another allergen (e.g., peanuts). In this example, the customer may still wish to order an item for herself that is shown as "grayed out" on screen interface 2350 because it contains peanuts, and/or an item for the family member that is shown as "grayed out" on screen interface 2350 because it contains milk. Some embodiments of the invention enable the customer to do so.

Although not illustrated in FIG. 23, it should be appreciated that some embodiments of the invention may enable items containing specific ingredients to be visually identified to the customer. In addition, some embodiments of the invention may enable a customer to save their indications in relation to a personal system account, so that the indications are automatically reflected on a version of the interface rendered for them.

In some embodiments, order accuracy may be enhanced through the use of a screen display that is capable of displaying graphic images. This type of screen display may, for example, face the customer from a cashier's station, be deployed in a food preparation area, or be situated in any other location from which the display of graphic images is desirable.

Conventionally, "order confirmation boards" face a customer from a cashier's station, and present only a text listing of items ordered by the customer. These conventional order confirmation boards are incapable of displaying images to the customer, and so they are necessarily incapable of displaying images which reflect the customer's customization of an item. By contrast, some embodiments of the invention provide a display screen which may face the customer from a cashier's station that is capable of graphically depicting an item that has been changed by the customer, reflecting the customer's changes in any of several ways.

Figure 24:
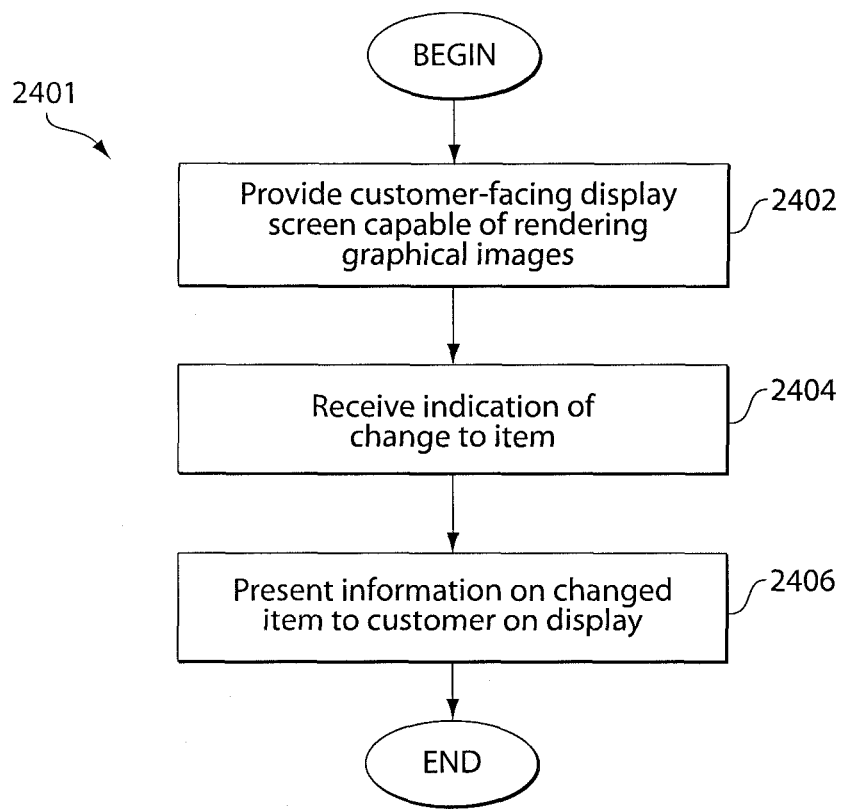
FIG. 24 is a flowchart showing a representative process for displaying information on an item using a customer-facing display, in accordance with some embodiments of the invention.

A representative process 2401 for providing such a display screen at a cashier's station is shown in FIG. 24. At the start of process 2401, a customer-facing display screen capable of rendering graphical images is provided at a cashier's station in act 2402. Any suitable type of display screen may be used, such as a liquid crystal display (LCD) or other type of screen capable of displaying graphics.

In act 2404, a customer order is received which includes a change to a standard item. Any form of customization may be specified, as embodiments of the invention are not limited in this respect. For example, an order may specify any of the changes described above in relation to FIGS. 6, 9A, 9B, 10, etc.

Process 2401 then proceeds to act 2406, wherein information on the customized item is presented to the customer on the display provided in act 2402. In some embodiments of the invention, this information may include one or more images of the customized item and/or its ingredients, to convey to the customer the types of changes made to the standard version of the item. Further, in some embodiments, an image of an ordered item may change dynamically as the customer submits the order, so that he/she may be provided with visual cues of the changes being made to the standard version of the item, thereby enhancing order accuracy. Process 2401 then completes.

Embodiments of the invention are not limited to being situated at a cashier's station, or to presenting only images of a changed item and/or its ingredients to a customer. For example, any suitable type of item or ingredient information may be displayed, to one or more viewers which may or may not include a customer. For example, a display screen may display any of the types of information described above, such as a list of the item's ingredients (e.g., with ingredients added and/or subtracted formatted differently than other ingredients in the list, as described above), nutritional information (e.g., updated as changes to a standard item are made by the customer), a representation of previously ordered (e.g., customized) items and/or items designated as favorites by the customer, and/or other information. Further, in some embodiments, a display screen may be capable of accepting input, and changing the information that is displayed as a result of the input. For example, a display screen may be capable of receiving touch, voice, and/or other forms of input, and may alter one or more pieces of information as input is received. As one example, a customer may provide input to request access to detailed nutritional information for an item shown on the display screen, and the screen may show this information in response to receiving the input. As another example, food preparation staff may provide input to access information on an order, or to indicate that items in an order have been prepared.

It should be appreciated that, in some embodiments of the invention, a customer need not have an account relationship with a restaurant to be able to view his/her previous orders. In this respect, conventional arrangements which enable a customer to view his/her previous orders require the customer to maintain an account with the restaurant (generally a loyalty account), which enables the restaurant to identify the customer and retrieve information on his/her previous orders from electronic file storage. In some embodiments of the invention, however, a customer need not maintain an account with the restaurant to be able to access information on his/her previous orders, but rather may simply proffer (e.g., swipe) the same credit card as was used to pay for the previous orders. As such, if a particular customer who does not have an account with a restaurant typically orders a certain item customized a certain way, then the customer may easily access that same order by simply proffering the same credit card, thereby streamlining the ordering process for the customer, and increasing the customer's overall satisfaction with the restaurant.

Figure 25:
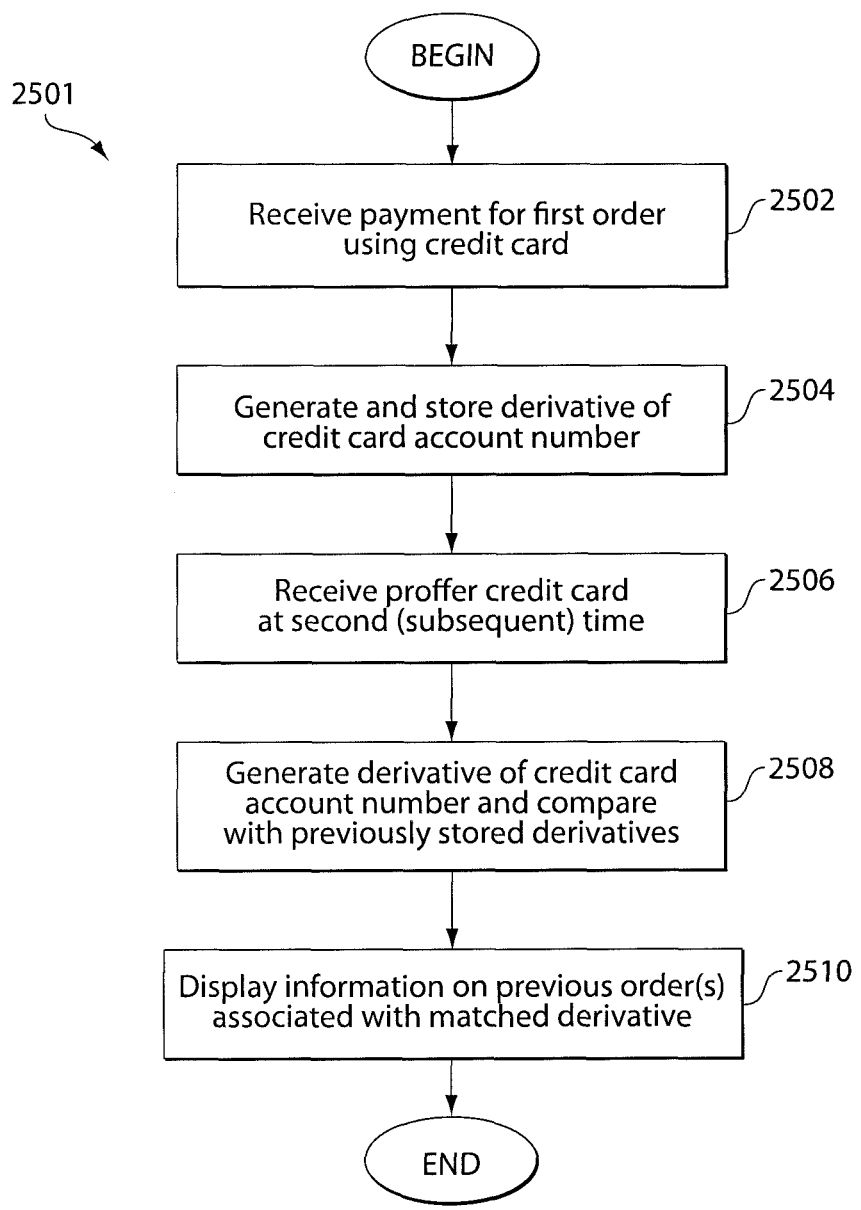
FIG. 25 is a flowchart showing a representative process for enabling a customer to access information on previous orders without having an account, in accordance with some embodiments of the invention.

A representative process 2501 for enabling a customer to access information on previous orders at a restaurant without maintaining an account with the restaurant is shown in FIG. 25. At the start of process 2501, payment is received for a first order using a credit card in act 2502. For example, a customer may place an order on-line, through a kiosk, or at a cashier's station, and use a credit card to pay for the order.

Process 2501 then proceeds to act 2504, wherein a derivative of the credit card account number is caused to be generated and stored. This may be performed in any of numerous ways. In some embodiments, the customer's use of the credit card to pay for the first order causes the credit card account number to be encrypted, and a token may be generated representing the encrypted account number. The token may be stored in association with information relating to the first order. It should be appreciated that encryption of the credit card account number, and the generation and storage of a token representing the account number rather than the account number itself, may be performed to enhance security and allay privacy concerns.

Process 2501 then proceeds to act 2506, wherein a proffer of the same credit card is received at a second time subsequent to the first time. For example, the customer may swipe the same credit card at a restaurant kiosk, present it to a cashier, or proffer it in any other suitable way.

In act 2508, the encryption and derivative generation performed in act 2504 is repeated, and the resulting derivative is compared with derivatives stored previously in association with order information. This comparison may be performed in any suitable way, as embodiments of the invention are not limited in this respect.

Process 2501 then proceeds to act 2510, wherein information on any previous order(s) associated with a matched token is displayed to the customer. For example, previous order information may be displayed on a kiosk screen, a customer-facing display screen (as described above in relation to FIG. 24), and/or using any other suitable display device. Process 2501 then completes.

Some embodiments of the invention provide techniques which enable a customer to easily register a loyalty account. In this respect, many restaurants offer loyalty accounts to customers, which, when registered by the customer, provide those customers access to discounts, promotional offers, and other types of useful information. However, many customers for which a loyalty account is opened never register the account by providing contact information, and so the restaurant is unable to send that useful information to the customer. By increasing the likelihood that a customer registers his/her loyalty accounts, a restaurant may improve its ability to provide useful information to the customer, thereby improving the customer's experiences with the restaurant, and also improve its ability to collect information from the customer that may aid the restaurant's marketing and/or product development efforts. Thus, in some embodiments of the invention, techniques are provided which make registering a loyalty account quick and easy for the customer.

Figure 26:
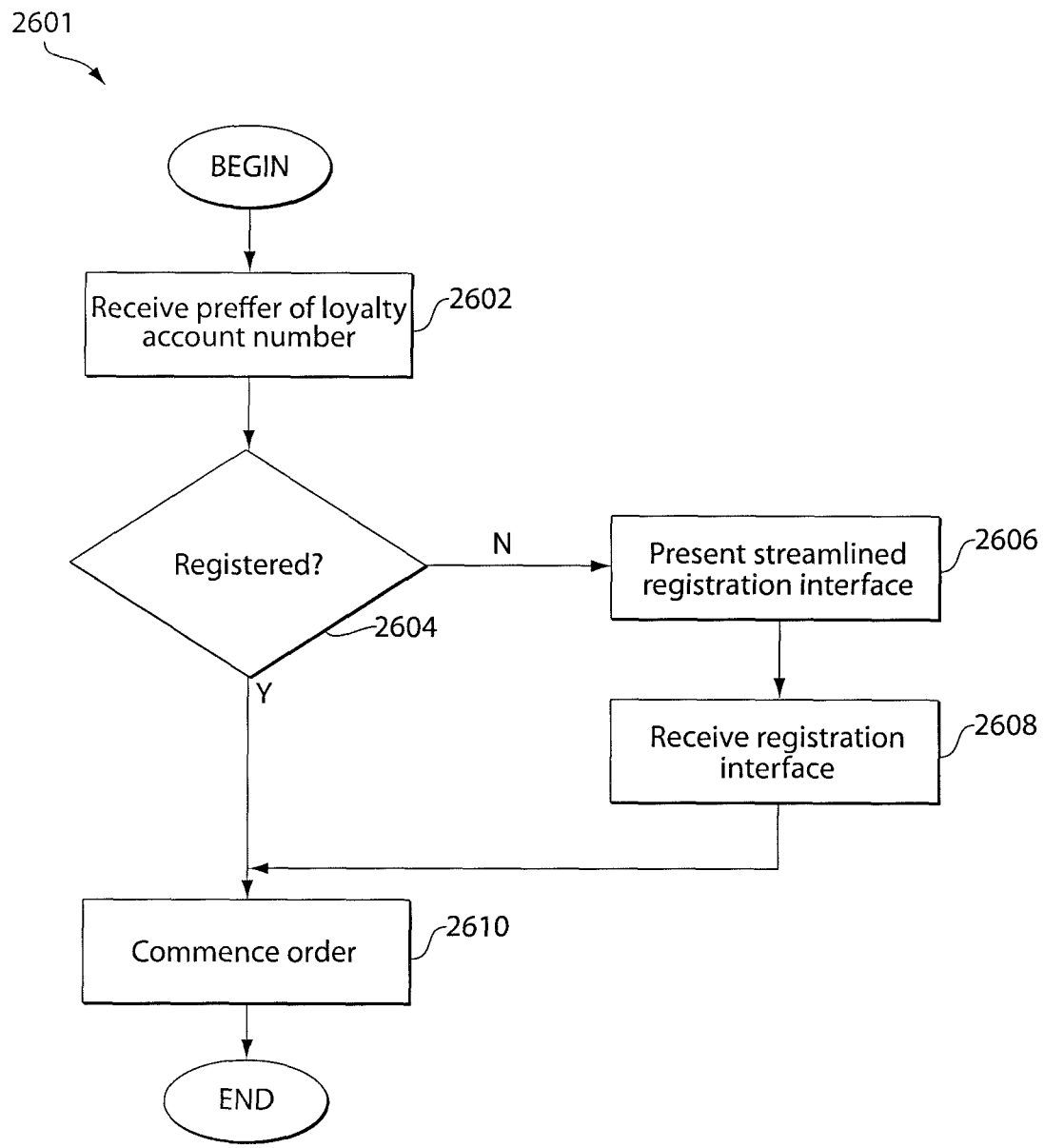
FIG. 26 is a flowchart showing a representative process for enabling a customer to register a loyalty account, in accordance with some embodiments of the invention.

A representative process 2601 for enabling a customer to quickly and easily register a loyalty account is shown in FIG. 26. At the start of process 2601, the proffer of a loyalty account number is received in act 2602. This may be performed in any of numerous ways. For example, a customer may swipe a loyalty account card having the number encoded thereon at a card reader, read the number to a cashier, or otherwise proffer the account number.

In act 2604, a determination is made whether the account associated with the received number has been registered. If not, process 2601 proceeds to act 2606, wherein a streamlined registration interface is presented to the customer in act 2606. The interface may offer the customer the opportunity to provide contact, demographic and/or other types of information quickly and easily, so that the customer does not perceive that providing it is an undue burden. The registration information provided by the customer is received in act 2608.

At the completion of act 2608, or if it is determined in act 2604 that the loyalty account is registered, process 2601 proceeds to act 2610, wherein the customer's order is received. Process 2601 then completes.

It should be appreciated that although many of the embodiments described above relate to sandwich offerings, embodiments of the invention are not so limited, and may be used in relation to any suitable type(s) of item(s). With respect to food and/or beverage items, embodiments of the invention may be used to customize or otherwise order salads, soups, desserts, breads, pastries, prepared dishes, cold beverages, hot beverages, pre-packaged foods, and/or any other suitable type of food and/or beverage item(s). However, it should further be appreciated that embodiments of the invention are not limited to being employed in relation to food and/or beverage items. For example, embodiments of the invention may be used to customize or otherwise order cookbooks, newspapers, mugs, or other items. The techniques and systems described herein may have applicability to any suitable type(s) of item(s), and embodiments of the invention may be implemented and/or used in any suitable way.

Figure 27:
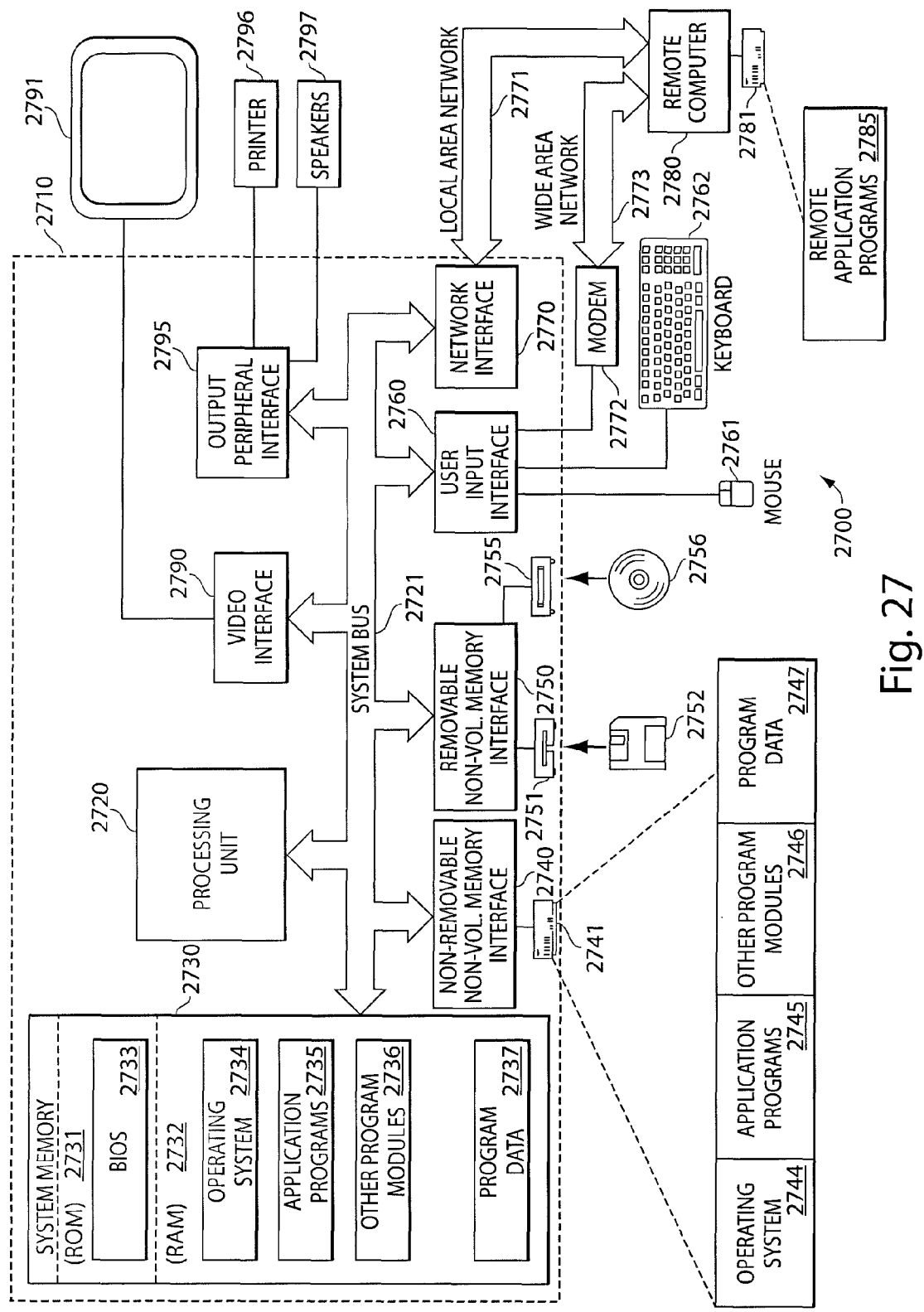
FIG. 27 is a block diagram depicting a representative computer system with which various aspects of embodiments of the invention may be implemented.

FIG. 27 illustrates one example of a suitable computing system environment 2700 which may be used to implement aspects of the invention. The computing system environment 2700 is only one example of a suitable computing environment, and is not intended to suggest any limitation as to the scope of use or functionality of the invention. Neither should the computing environment 2700 be interpreted as having any dependency or requirement relating to any one or combination of components illustrated in the exemplary operating environment 2700. In this respect, the invention is operational with numerous other general purpose or special purpose computing system environments or configurations. Examples of well-known computing systems, environments, and/or configurations that may be suitable for use with the invention include, but are not limited to, personal computers, server computers, mobile or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 27 depicts a general purpose computing device in the form of a computer 2710. Components of computer 2710 may include, but are not limited to, a processing unit 2720, a system memory 2730, and a system bus 2721 that couples various system components including the system memory to the processing unit 2720. The system bus 2721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 2710 typically includes a variety of computer readable media. Computer readable media can be any available media that can be accessed by computer 2710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media which may be used to store the desired information and may be accessed by computer 2710. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 2730 includes computer storage media in the form of volatile and/or nonvolatile memory such as read only memory (ROM) 2731 and random access memory (RAM) 2732. A basic input/output system 2733 (BIOS), containing the basic routines that help to transfer information between elements within computer 2710, such as during start-up, is typically stored in ROM 2731. RAM 2732 typically contains data and/or program modules that are immediately accessible to and/or presently being operated on by processing unit 2720. By way of example, and not limitation, FIG. 27 illustrates operating system 2734, application programs 2735, other program modules 2736, and program data 2737.

The computer 2710 may also include other removable/non-removable, volatile/nonvolatile computer storage media. By way of example only, FIG. 27 illustrates a hard disk drive 2741 that reads from or writes to non-removable, nonvolatile magnetic media, a magnetic disk drive 2751 that reads from or writes to a removable, nonvolatile magnetic disk 2752, and an optical disk drive 2755 that reads from or writes to a removable, nonvolatile optical disk 2756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2741 is typically connected to the system bus 2721 through an non-removable memory interface such as interface 2740, and magnetic disk drive 2751 and optical disk drive 2755 are typically connected to the system bus 2721 by a removable memory interface, such as interface 2750.

The drives and their associated computer storage media discussed above and illustrated in FIG. 27, provide storage of computer readable instructions, data structures, program modules and other data for the computer 2710. In FIG. 27, for example, hard disk drive 2741 is illustrated as storing operating system 2744, application programs 2745, other program modules 2746, and program data 2747. Note that these components can either be the same as or different from operating system 2734, application programs 2735, other program modules 536, and program data 2737. Operating system 2744, application programs 2745, other program modules 2746, and program data 2747 are given different numbers here to illustrate that, at a minimum, they are different copies. A user may enter commands and information into the computer 2710 through input devices such as a keyboard 2762 and pointing device 2761, commonly referred to as a mouse, trackball or touch pad. Other input devices (not shown) may include a microphone, joystick, game pad, satellite dish, scanner, or the like. These and other input devices are often connected to the processing unit 2720 through a user input interface 560 that is coupled to the system bus, but may be connected by other interface and bus structures, such as a parallel port, game port or a universal serial bus (USB). A monitor 2791 or other type of display device is also connected to the system bus 2721 via an interface, such as a video interface 2790. In addition to the monitor, computers may also include other peripheral output devices such as speakers 2797 and printer 2796, which may be connected through a output peripheral interface 2795.

The computer 2710 may operate in a networked environment using logical connections to one or more remote computers, such as a remote computer 2780. The remote computer 2780 may be a personal computer, a server, a router, a network PC, a peer device or other common network node, and typically includes many or all of the elements described above relative to the computer 2710, although only a memory storage device 2781 has been illustrated in FIG. 27. The logical connections depicted in FIG. 27 include a local area network (LAN) 2771 and a wide area network (WAN) 2773, but may also include other networks. Such networking environments are commonplace in offices, enterprise-wide computer networks, intranets and the Internet.

When used in a LAN networking environment, the computer 2710 is connected to the LAN 2771 through a network interface or adapter 2770. When used in a WAN networking environment, the computer 2710 typically includes a modem 2772 or other means for establishing communications over the WAN 2773, such as the Internet. The modem 2772, which may be internal or external, may be connected to the system bus 2721 via the user input interface 2760, or other appropriate mechanism. In a networked environment, program modules depicted relative to the computer 2710, or portions thereof, may be stored in the remote memory storage device. By way of example, and not limitation, FIG. 27 illustrates remote application programs 2785 as residing on memory device 2781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include different acts than those which are described, and/or which may involve performing some acts simultaneously, even though the acts are shown as being performed sequentially in the embodiments described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for facilitating an order of a food item by a customer, comprising acts of:
   (A) causing a plurality of images each representing an ingredient of the food item to be displayed to the customer via a screen interface;
   (B) receiving input from the customer specifying a change to at least one ingredient of the food item; and
   (C) in response to receiving the input in the act (B), causing at least some of the plurality of images caused to be displayed in the act (A) to be modified to reflect the change to the at least one ingredient of the item.

2. The method of claim 1, wherein the food item is a sandwich made with a first type of bread having a first set of dimensions, the act (B) comprises receiving input specifying that a second type of bread, having a second set of dimensions different than the first set of dimensions, is to be substituted for the first type of bread, and the act (C) comprises re-scaling the at least some images.

3. The method of claim 1, wherein the food item is a salad, the act (B) comprises receiving input specifying an addition of at least one ingredient to, or a removal of at least one ingredient from, the salad, and the act (C) comprises modifying a spacing of at least some of the plurality of images.

4. The method of claim 1, wherein the food item is a salad, the act (B) comprises receiving input specifying an addition of at least one ingredient to, or a removal of at least one ingredient from, the salad, and the act (C) comprises modifying how the plurality of images are arranged.

5. The method of claim 1, wherein the food item is a salad, the act (B) comprises receiving input specifying an addition of at least one ingredient to, or a removal of at least one ingredient from, the salad, and the act (C) comprises re-scaling at least some of the plurality of images.

6. The method of claim 1, wherein the act (B) comprises receiving input specifying a change to an amount of a first ingredient in the food item, and the act (C) comprises exchanging one or more images for the first ingredient caused to be displayed in the act (A) for another one or more images, and causing the other one or more images to be displayed.

7. A computer system for facilitating an order of a food item by a customer, the computer system comprising:
  at least one processor programmed to:
    cause a plurality of images each representing an ingredient of the food item to be displayed to the customer via a screen interface;
    receive input from the customer specifying a change to at least one ingredient of the food item; and
    in response to receiving the input, cause at least some of the plurality of images caused to be displayed to be modified to reflect the change to the at least one ingredient of the item.

8. The computer system of claim 7, wherein the food item is a sandwich made with a first type of bread having a first set of dimensions, and wherein the at least one processor is programmed to receive input specifying that a second type of bread, having a second set of dimensions different than the first set of dimensions, is to be substituted for the first type of bread, and to re-scale the at least some images.

9. The computer system of claim 7, wherein the food item is a salad, and wherein the at least one processor is programmed to receive input specifying an addition of at least one ingredient to, or a removal of at least one ingredient from, the salad, and to modify a spacing of at least some of the plurality of images.

10. The computer system of claim 7, wherein the food item is a salad, and wherein the at least one processor is programmed to receive input specifying an addition of at least one ingredient to, or a removal of at least one ingredient from, the salad, and to modify how the plurality of images are arranged.

11. The computer system of claim 7, wherein the food item is a salad, and wherein the at least one processor is programmed to receive input specifying an addition of at least one ingredient to, or a removal of at least one ingredient from, the salad, and to re-scale at least some of the plurality of images.

12. The computer system of claim 7, wherein the at least one processor is programmed to receive input specifying a change to an amount of a first ingredient in the food item, to exchange one or more images for the first ingredient caused to be displayed for another one or more images, and to cause the other one or more images to be displayed.

13. At least one computer-readable storage medium having instructions encoded thereon which, when executed, perform a method for facilitating an order of a food item by a customer, the method comprising acts of:
  (A) causing a plurality of images each representing an ingredient of the food item to be displayed to the customer via a screen interface;
  (B) receiving input from the customer specifying a change to at least one ingredient of the food item; and
  (C) in response to receiving the input in the act (B), causing at least some of the plurality of images caused to be displayed in the act (A) to be modified to reflect the change to the at least one ingredient of the item.

14. The at least one computer-readable storage medium of claim 13, wherein the food item is a sandwich made with a first type of bread having a first set of dimensions, the act (B) comprises receiving input specifying that a second type of bread, having a second set of dimensions different than the first set of dimensions, is to be substituted for the first type of bread, and the act (C) comprises re-scaling the at least some images.

15. The at least one computer-readable storage medium of claim 13, wherein the food item is a salad, the act (B) comprises receiving input specifying an addition of at least one ingredient to, or a removal of at least one ingredient from, the salad, and the act (C) comprises modifying a spacing of at least some of the plurality of images.

16. The at least one computer-readable storage medium of claim 13, wherein the food item is a salad, the act (B) comprises receiving input specifying an addition of at least one ingredient to, or a removal of at least one ingredient from, the salad, and the act (C) comprises modifying how the plurality of images are arranged.

17. The at least one computer-readable storage medium of claim 13, wherein the food item is a salad, the act (B) comprises receiving input specifying an addition of at least one ingredient to, or a removal of at least one ingredient from, the salad, and the act (C) comprises re-scaling at least some of the plurality of images.

18. The at least one computer-readable storage medium of claim 13, wherein the act (B) comprises receiving input specifying a change to an amount of a first ingredient in the food item, and the act (C) comprises exchanging one or more images for the first ingredient caused to be displayed in the act (A) for another one or more images, and causing the other one or more images to be displayed.

* * * * *